US012671618B2

(12) United States Patent
Shin et al.

(10) Patent No.: US 12,671,618 B2
(45) Date of Patent: Jun. 30, 2026

(54) TRANSMITTING Bluetooth SIGNALS USING WiFi HARDWARE

(71) Applicant: THE REGENTS OF THE UNIVERSITY OF MICHIGAN, Ann Arbor, MI (US)

(72) Inventors: Kang G. Shin, Ann Arbor, MI (US); Hsun-Wei Cho, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 219 days.

(21) Appl. No.: 18/578,918

(22) PCT Filed: Jul. 13, 2022

(86) PCT No.: PCT/US2022/036915
§ 371 (c)(1),
(2) Date: Jan. 12, 2024

(87) PCT Pub. No.: WO2023/287854
PCT Pub. Date: Jan. 19, 2023

(65) Prior Publication Data
US 2024/0259245 A1     Aug. 1, 2024

Related U.S. Application Data

(60) Provisional application No. 63/221,158, filed on Jul. 13, 2021.

(51) Int. Cl.
H04L 27/26 (2006.01)
H04W 80/02 (2009.01)

(52) U.S. Cl.
CPC ...... H04L 27/2626 (2013.01); H04L 27/2607 (2013.01); H04W 80/02 (2013.01)

(58) Field of Classification Search
CPC ............. H04L 27/2626; H04L 27/2607; H04L 27/2697; H04L 27/36; H04L 27/2602;
(Continued)

(56) References Cited

U.S. PATENT DOCUMENTS 10,749,991 B2     8/2020   He et al.
11,811,434 B2 *  11/2023   Jeong .................. H04L 27/2602
(Continued)

FOREIGN PATENT DOCUMENTS

WO        WO-2020086987 A1      4/2020

OTHER PUBLICATIONS

International Search Report of the International Searching Authority, issued in PCT/US2022/036915, mailed Oct. 26, 2022; ISA/KR.
(Continued)

*Primary Examiner* — Betsy Deppe
(74) *Attorney, Agent, or Firm* — Harness, Dickey & Pierce, P.L.C.

(57) ABSTRACT

A technique is presented that enables transmitting data packets decodable in accordance with a first wireless communication protocol using a transmitter configured in accordance with a second wireless communication protocol. In an example implementation of this disclosure, Bluetooth decodable packets can be sent with existing and widely-deployed WiFi devices without modifying NIC firmware or hardware. The transmitted packets are decodable by unmodified Bluetooth devices, thus eliminating the cost of dedicated Bluetooth hardware and deployment.

21 Claims, 10 Drawing Sheets

(58) Field of Classification Search

CPC ..... H04L 27/2628; H04L 69/08; H04L 69/18; H04W 84/12; H04W 80/00; H04W 80/02; H04W 4/80; H04W 16/14

See application file for complete search history.

(56) References Cited

U.S. PATENT DOCUMENTS

| | | |
|---|---|---|
| 2004/0203709 A1 | 10/2004 | Luneau |
| 2008/0247367 A1 | 10/2008 | Guo et al. |
| 2017/0302404 A1 | 10/2017 | Lee et al. |
| 2018/0352055 A1 | 12/2018 | He et al. |

OTHER PUBLICATIONS

Extended European Search Report regarding European patent application No. 22842791, dated Apr. 10, 2025.

Van Der Merwe Kobus et al: "WEBee: Physical-Layer Cross-Technology Communication via Emulation", Proceedings of the 23rd Annual International Conference on Mobile Computing and Networking, Mobicom '17, Oct. 4, 2017.

Chen Weiwei et al: "Enabling Global Cooperation for Heterogeneous Networks via Reliable Concurrent Cross Technology Communications", IEEE Transactions on Mobile Computing, IEEE Service Center, Los Alamitos, CA, US, vol. 21, No. 11, Mar. 17, 2021.

Chen Yongrui et al: "Reliable Physical-Layer Cross-Technology Communication With Emulation Error Correction", IEEE / ACM Transactions On Networking, IEEE / ACM, New York, NY, US, vol. 28, No. 2, Jan. 30, 2020.

Cho Hsun-Wei Hsunweic@Umich Edu et al: "BlueFi bluetooth over WiFi", Proceedings of the 42nd ACM SIGPLAN International Conference on Programming Language Design and Implementation, ACMPUB27, New York, NY, USA, Aug. 9, 2021.

* cited by examiner $$Fig-1$$

$\theta[n]$:

$\hat{\theta}[n]$:

CP

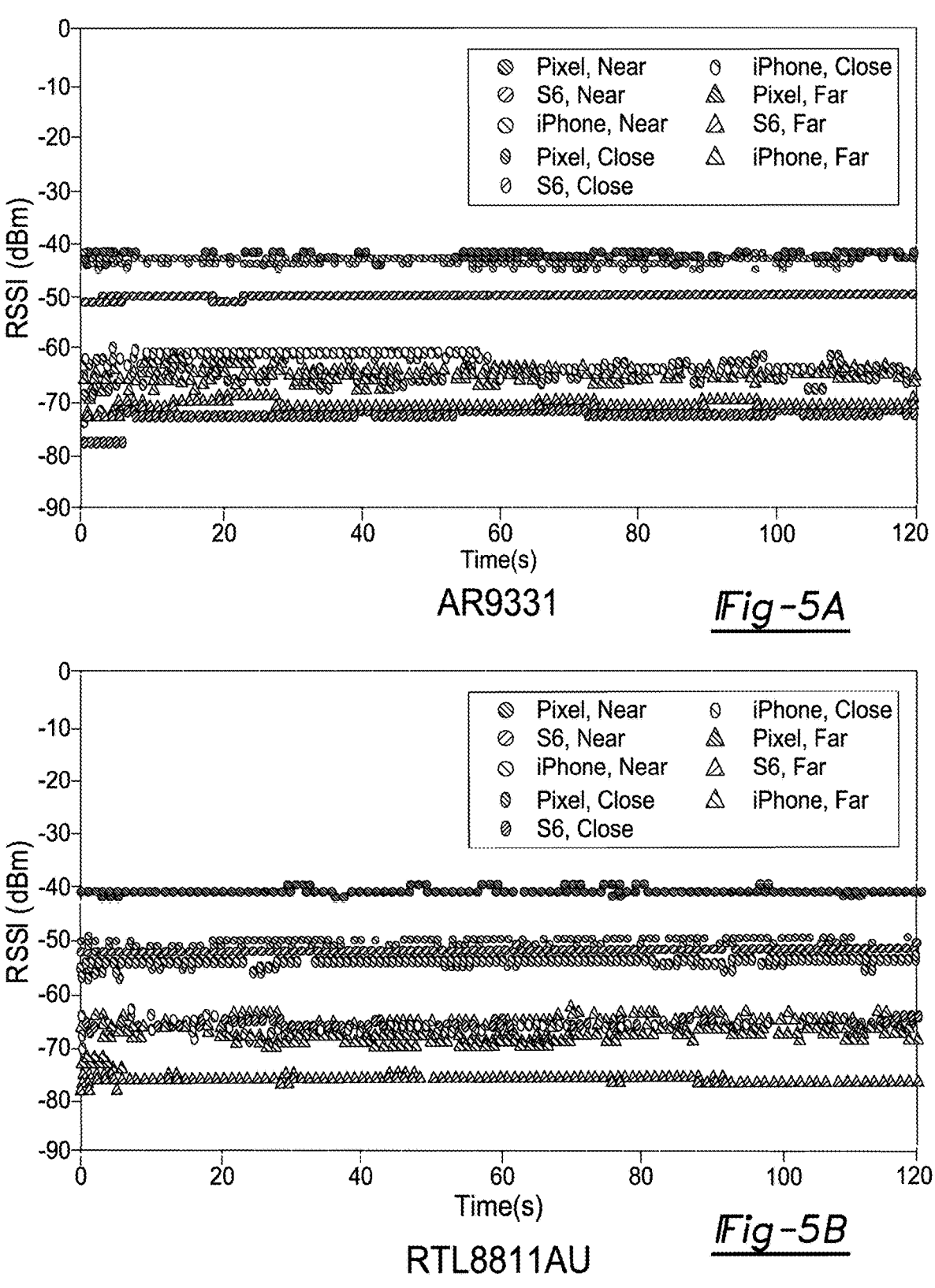
AR9331                    *Fig-5A*
RTL8811AU                 *Fig-5B*

(a) Pixel (b) S6

(c) iPhone (a) Using Dedicated Bluetooth Hardware

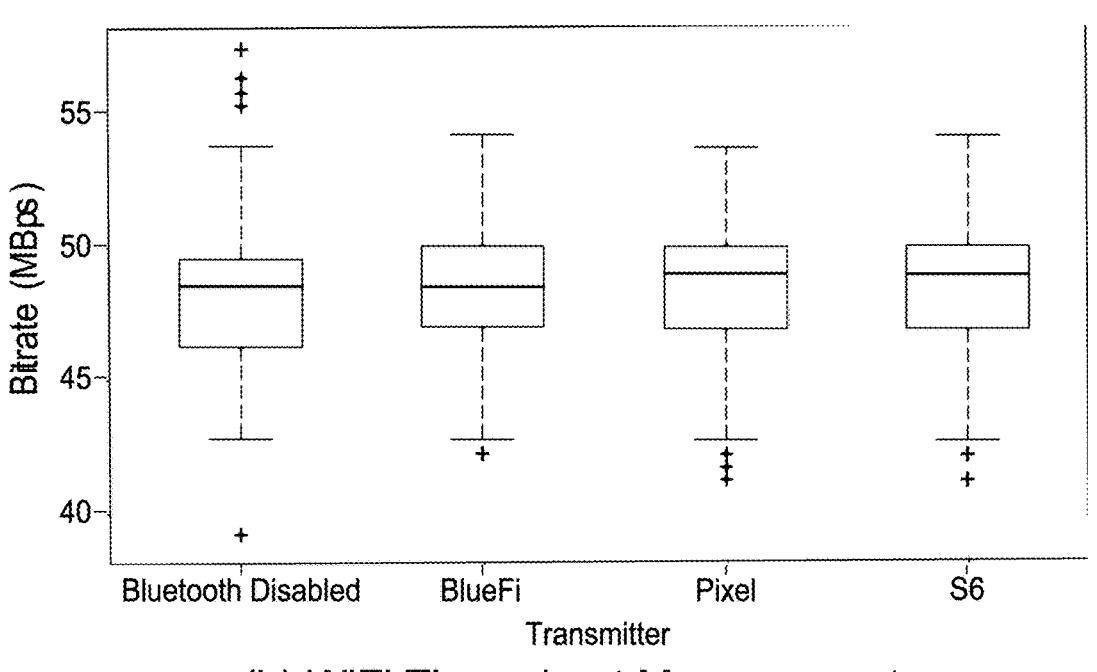
(b) WiFi Throughput Measurements
*Fig-7B*
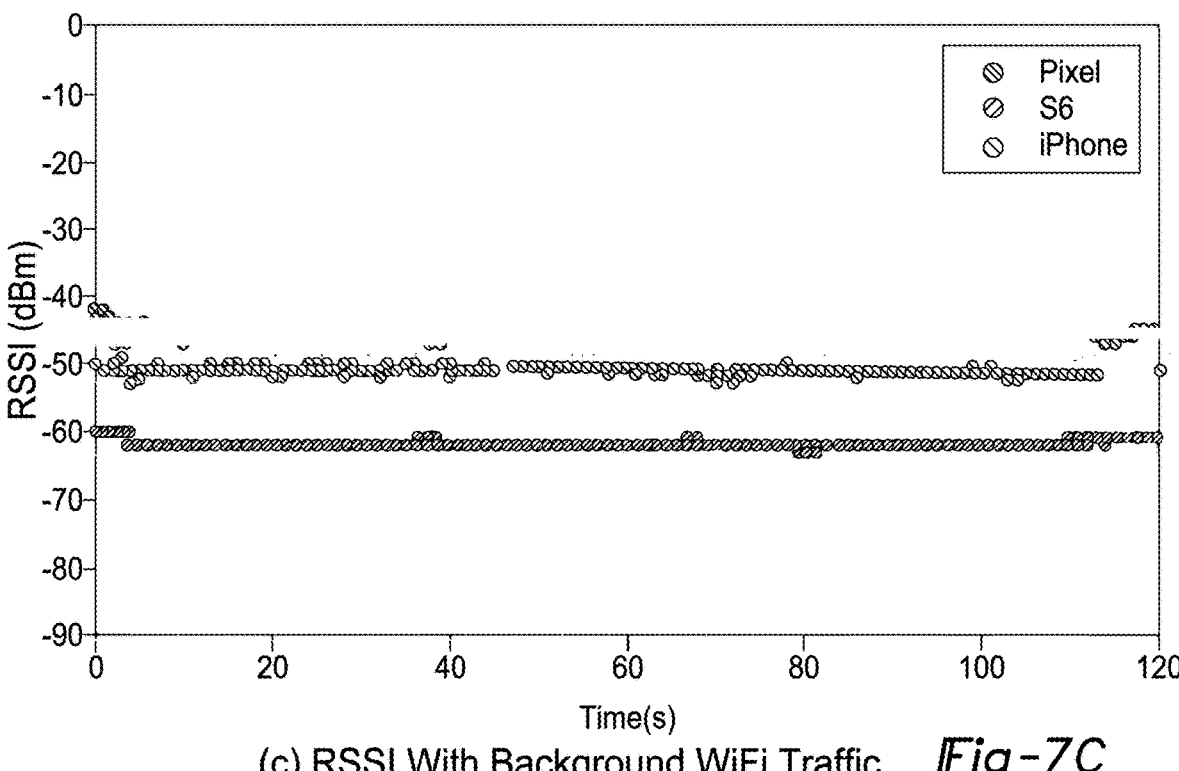
(c) RSSI With Background WiFi Traffic          *Fig-7C*

(a) Pixel (b) S6

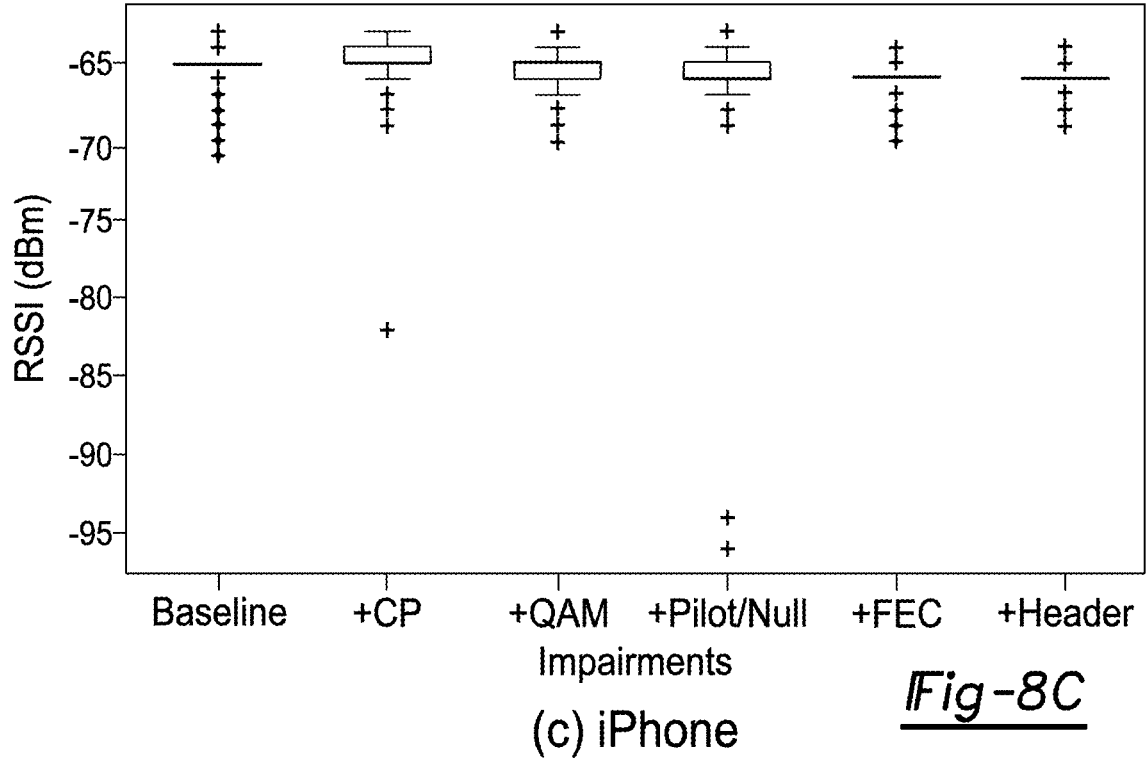
(c) iPhone
*Fig-8C*
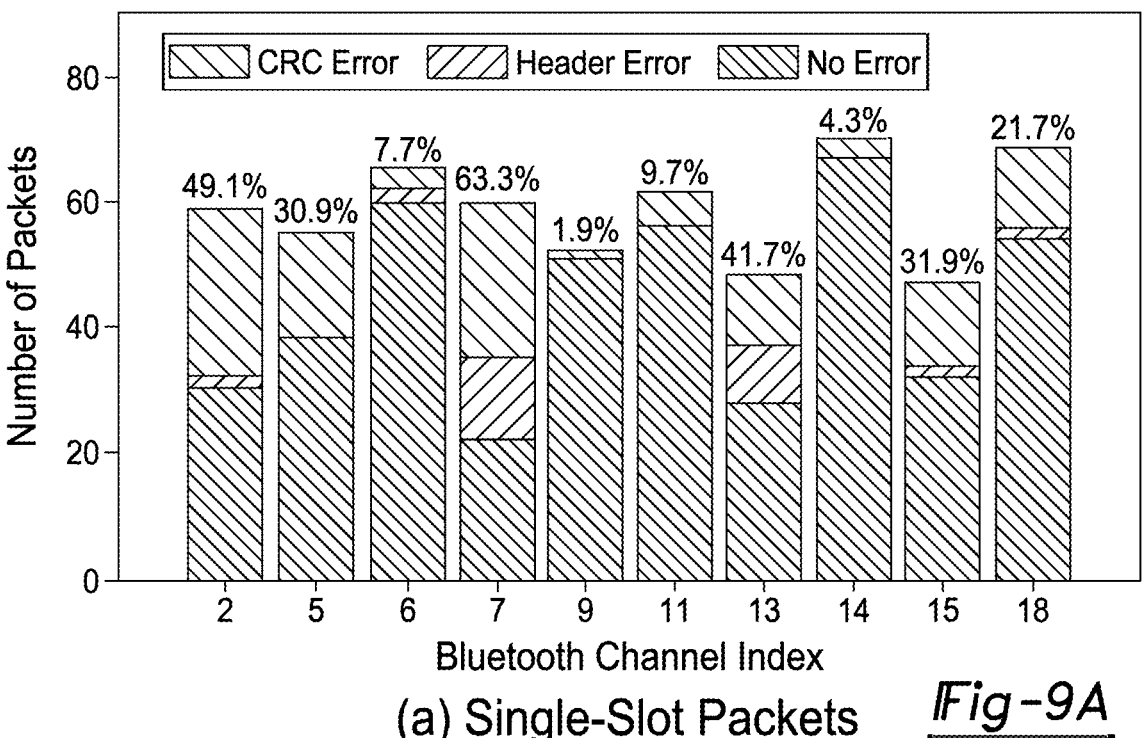
(a) Single-Slot Packets      *Fig-9A*

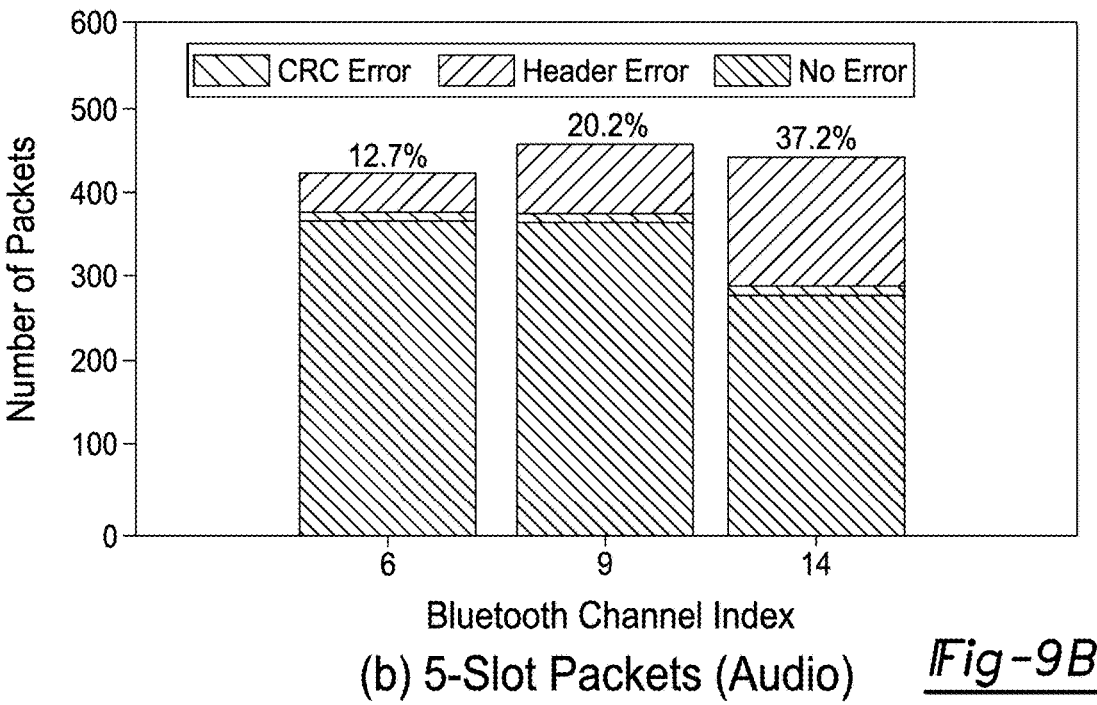
(b) 5-Slot Packets (Audio)    *Fig-9B*
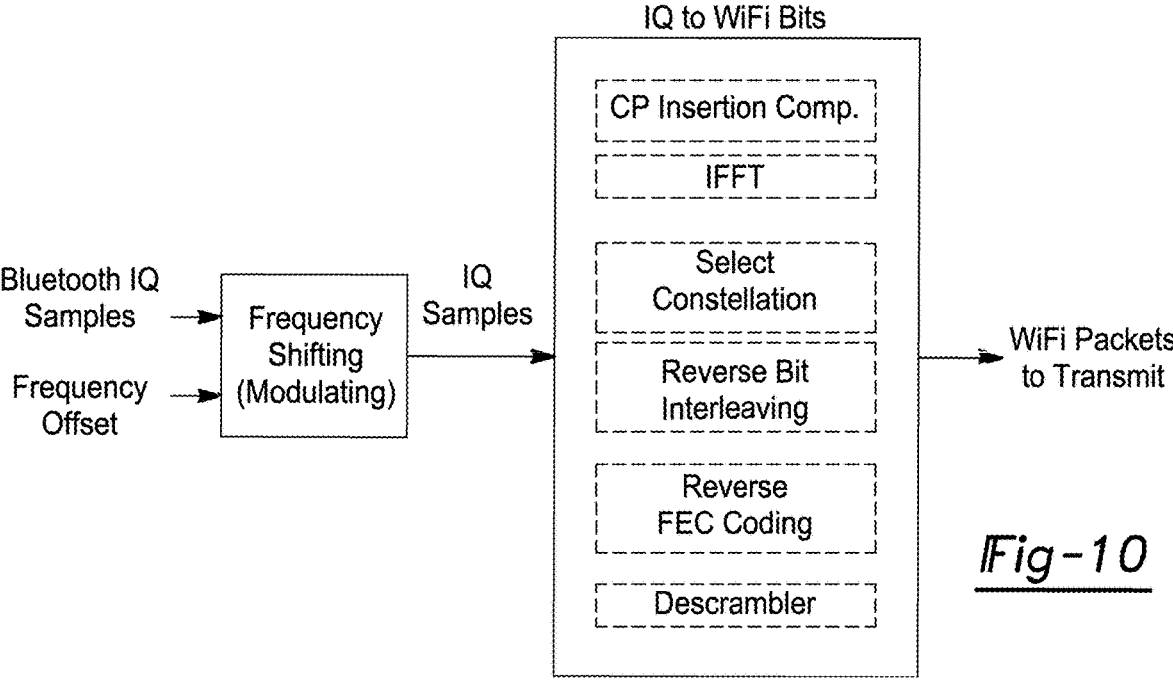
*Fig-10*

TRANSMITTING Bluetooth SIGNALS USING WiFi HARDWARE

CROSS-REFERENCE TO RELATED APPLICATIONS

This application is a 371 U.S. National Phase of International Application No. PCT/US2022/036915, filed on Jul. 13, 2022, which claims priority to U.S. Patent Application No. 63/221,158, filed Jul. 13, 2021. The entire disclosures of the above applications are incorporated herein by reference.

FIELD

The present disclosure relates to techniques for transmitting Bluetooth data packets using WiFi hardware.

BACKGROUND

The future of wireless communication is nothing short of heterogeneous technologies, as each technology comes with its own set of strengths and weaknesses. Tailored to its specific communication paradigm, each wireless standard/technology typically uses vastly different bandwidth, modulation/coding, and medium access control. This is bad news for multi-standard devices as concurrently supporting multiple heterogeneous wireless standards is more complicated and costly.

Bluetooth plays a key role in providing valuable functions such as location and automation services in business, industrial or public settings, such as retailers, buildings and airports. The number of Bluetooth location-service devices is projected to grow at an annual rate of 43% and reach 431M by 2023. Bluetooth is also the dominant technology used for personal audio streaming. 1.1B Bluetooth audio streaming devices were shipped in 2019 alone and the figure is expected to grow 7% per year.

There are costs and other issues associated with supporting Bluetooth (BT) communication. Dedicated Bluetooth or WiFi-BT combo chips increase costs and occupy more board-space. Hardware development and certification are also needed. For example, as a wireless transmitter, every device must be tested and certified by regulatory entities, such as the FCC and ETSI. This is an expensive and time-consuming process. The radio certification alone is estimated to cost approximately $8,000 USD for each regulatory entity. This certification is not required for pre-certified modules or products, but the pre-certified devices are much more expensive. For example, each standalone Bluetooth Beacon point made by Cisco costs $695 USD. Even with pre-built/certified devices, there is an additional cost for installing and maintaining Bluetooth infrastructures. Additional wiring for power and signaling is also required. For large venues, the Bluetooth infrastructure must cover the whole area even if there exists an already-deployed WiFi infrastructure. Finally, Bluetooth devices must carefully coordinate with WiFi devices to minimize the interference between them.

On the other hand, more than 30B WiFi devices have already been shipped over the recent years, of which more than 13B devices are in active use. Many of these devices are Access Points (APs) already deployed in the environments which provide pervasive coverage of WiFi signals. Cisco estimates that the number of WiFi hotspots in public alone will reach 628 million by 2023. If WiFi hardware can be concurrently re-purposed as Bluetooth hardware, dedicated Bluetooth hardware would not be needed, hence eliminating many of the above-mentioned costs and issues altogether. By directly reusing existing WiFi devices, one can eliminate the costs of hardware development, manufacturing and deployment. If the BT signals are fully compliant with the WiFi standard, the expensive process of regulatory certification can be avoided since the equipment has already been certified for WiFi. Moreover, sharing the same antenna, radio frontend and processing blocks simplifies the hardware design and coordination. Since WiFi hardware constantly monitors radio activities, its medium access mechanisms, such as RTS/CTS and CSMA/CA, will be utilized even when sending an emulated Bluetooth packet, which will reduce the possibility of colliding with other WiFi traffic. Finally, thanks to the connectivity of WiFi devices, one can control these emulated BT functions remotely, even from cloud servers, thus fitting the IoT paradigm nicely.

In this disclosure, techniques are presented that enable the transmission of legitimate BT signals via 802.11n-compliant hardware (referred to herein as BlueFi. BlueFi requires no modification whatsoever to the hardware and firmware of Bluetooth receivers and of WiFi chips. Since newer WiFi standards, such as 802.11ac and 802.11ax, mandate the compliant hardware to be backward-compatible with 802.11n, BlueFi can run on 802.11ac and 802.11ax hardware as well. BlueFi carefully compensates and reverses the operations of WiFi hardware, and crafts 802.11n-compliant packets which are also decodable by Bluetooth devices. Since it leverages the overall WiFi standard and vendor-agnostic hardware functions, BlueFi can run on any 802.11n-compliant chips, instead of specific chips from particular manufacturers.

This section provides background information related to the present disclosure which is not necessarily prior art.

SUMMARY

This section provides a general summary of the disclosure, and is not a comprehensive disclosure of its full scope or all of its features.

A computer-implemented method is presented for transmitting data packets decodable in accordance with a first wireless communication protocol (e.g., Bluetooth) using a transmitter configured in accordance with a second wireless communication protocol (e.g., WiFi). The method includes: receiving an in-phase and quadrature (IQ) signal to be sent by the transmitter, where the IQ signal includes one or more symbols therein and is to be decoded in accordance with the first wireless communication protocol; for each of the one or more symbols, manipulating a given symbol to compensate for cyclic prefix insertion, converting the given symbol from time domain to frequency domain, and selecting a constellation from a constellation diagram for the given symbol, where the selected constellation has the shortest Euclidean distance to the symbol and corresponds to a bit sequence; and for each bit sequence, reconstructing an input bit sequence for an encoder, thereby constructing a target bit stream for the transmitter. The target bit stream is then transmitted using a transmitter.

In one embodiment, a given symbol is manipulated to compensate for cyclic prefix insertion by replacing the last n samples in the cyclic prefix with the last n samples in the given symbol, concatenating the first 8−n samples in cyclic prefix and the last n samples in the given symbol to form a replacement string, and replacing both the last 8 samples in the symbol and the cyclic prefix in the symbol with the replacement string, where n is an integer between zero and eight.

In some embodiments, compensation for cyclic prefix insertion further comprises replacing the first sample of the given symbol, excluding the cyclic prefix, with the first sample in the next cyclic prefix.

The transmitter may be configured to use shortest cyclic prefix.

In some embodiments, the input bit sequence is reconstructed using a Viterbi algorithm or lookup tables.

A frequency in the second wireless communication protocol is selected that preferably avoids pilot subcarriers and null subcarriers in the second wireless communication protocols prior to the step of reconstructing an input bit sequence for an encoder.

Prior to manipulating a given symbol to compensate for cyclic prefix insertion, the IQ signal may be modulated within one channel of the second communication protocol to compensate for frequency difference between the second communication protocol and the first communication protocol, where the modulating the IQ signal occurs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 5A and 5B are graphs showing signal strength for different phones transmitting data packets using two different WiFi devices, respectively.

FIG. 7B is a graph showing WiFi throughput measurements for different transmitter scenarios.

FIG. 7C is a graph showing signal strength for different phones with background traffic.

FIGS. 8A-8C are graphs showing the effects of impairments on three different phones, respectively.

FIGS. 9A and 9B are graphs showing the packet error rate for two scenarios.

FIG. 10 is a diagram depicting an implementation for frequency hopping Bluetooth packets within a WiFi channel.

Corresponding reference numerals indicate corresponding parts throughout the several views of the drawings.

DETAILED DESCRIPTION

Figure 1:
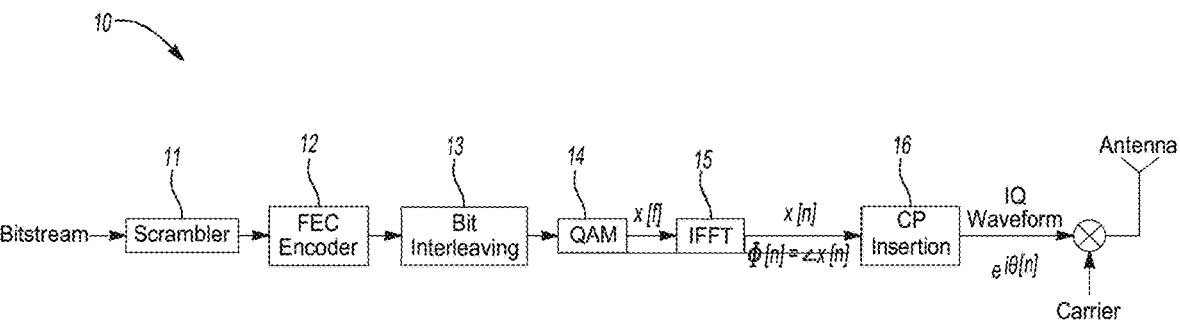
FIG. 1 is a block diagram of an example 802.11n transmitter.

Example embodiments will now be described more fully with reference to the accompanying drawings.

Transmitting BT signals using WiFi hardware is very challenging since the two wireless standards are very different from each other. At the highest level, Bluetooth encodes the information in the time domain; whereas, WiFi (specifically, 802.11a/g/n/ac/ax) uses OFDM and encodes the information in the frequency domain. Furthermore, most of the bit manipulation and signal processing will be automatically applied by WiFi hardware, and they cannot be bypassed. These operations will appear as signal impairments when one tries to transmit a Bluetooth waveform. Four major sources of impairments introduced by WiFi hardware are discussed below.

First, OFDM systems use cyclic prefix (CP) insertion to overcome inter-symbol interference (ISI). Therefore, a small portion of the Bluetooth waveform to be transmitted will be overridden by insertion of the CP, which is a copy of the tail of an OFDM symbol. Specifically, one WiFi symbol corresponds to approximately four (4) Bluetooth bits. Therefore, part of the IQ waveform in bit 3 will override the IQ waveform in bit 0. It has been found that a Bluetooth receiver will not be able to pick up the signal without carefully compensating the CP insertion process.

Second, OFDM encodes the information in the frequency domain before applying IFFT to generate the time-domain signal. Although one can use FFT to get the frequency-domain equivalent of a Bluetooth waveform, one cannot perfectly reconstruct the frequency-domain signal since a WiFi transmitter can only generate constellations with a very coarse resolution in the frequency domain. For example, using 64 QAM, samples at each subcarrier in the frequency domain must be selected from one of the 64 constellations. The difference between the selected constellation and the ideal value causes impairments in the frequency domain and subsequently in the time domain. Selecting the optimal constellations for the best Bluetooth performance can be formulated as an integer-programming (IP) problem and hence is NP-Complete. Solving the IP problem by exhaustive search is nearly impossible for this problem size.

Third, not all subcarriers in one OFDM symbol are used for data transmission. Four of the subcarriers are for pilot signals and they are, on average, of higher magnitudes than those for data transmission. In contrast, some subcarriers, such as subcarrier 0, must be 0. These pilots and nulls will corrupt the transmission waveform if they are too close to the center frequency of a Bluetooth channel.

Fourth, WiFi uses forward error correction (FEC) to combat communication errors. Since FEC encoders add redundancy to the bit-stream, some bits are related at the encoder's output. So, the encoder cannot generate arbitrary sequences. This invention must thus decide which bits are more important than others and find an input sequence that minimizes the important bits' hamming distance between the target output sequence and the reconstructed output sequence.

To explore the opportunities of leveraging the functionalities of existing WiFi hardware to transmit Bluetooth signals, the PHY specifications of Bluetooth and 802.11n are compared below.

Bluetooth uses GFSK (Gaussian Frequency-Shift Keying), which is frequency-shift keying with a Gaussian filter applied to the input bit-stream to reduce spectral leakage. For FSK, the output has a positive frequency deviation for bit "1" and a negative frequency deviation for bit "0". Since phases can be obtained by integrating frequencies, sending 1's results in phases with a positive slope and sending 0's results in phases with a negative slope. In addition, since no information is encoded in the amplitude of the time-domain waveform, a Bluetooth packet can be fully characterized by only the waveform's phases. Bluetooth devices should support the basic 1 Mbps data rate, so the bit duration in Bluetooth is 1000 ns.

For Bluetooth beacons, advertisement packets are broadcast on 2402, 2426 or 2480 MHz and frequency hopping is not required for beacon operation. In fact, it is the receiver's responsibility to scan all 3 advertisement channels and the transmitter can transmit at 1, 2 or 3 channels. In contrast, frequency hopping is critical to the operation of connected devices and packets are transmitted in time slots. Each time slot is 625 us long and a device can only start transmission in every other time slot. Once the transmission starts, a single packet can occupy multiple (3 or 5) slots and the frequency stays the same during a multi-slot transmission.

On the other hand, 802.11n inherited the same OFDM structure as 802.11a and 802.11g. FIG. 1 shows the block diagram of a typical 802.11n transmitter. The transmitter 10 is comprised of: a scrambler 11, an FEC encoder 12, a bit interleaver 13, a quadrature amplitude modulator 14, a transformer 15 and a CP insertion block 16. It is to be understood that only the relevant components of the transmitter are discussed in relation to FIG. 1, but that other components may be needed to implement the transmitter.

During operation, the bit-stream, sent from the MAC layer, is fed to the scrambler 11 to remove long-running 1's or 0's. The scrambler XORs the input bit-stream with a pseudorandom sequence generated by shift registers. To enhance robustness, a forward error correction (FEC) encoder 12 then adds redundancy to the scrambled bit-stream. Different code rates can be selected and are achieved by "puncturing" the encoded bit-stream. Instead of assigning adjacent bits to the same or nearby subcarriers, a bit interleaver 13 enhances robustness further by evenly spreading nearby bits to subcarriers that are far apart. In the mandatory 20 MHz mode, 52 out of 64 subcarriers are used for data transmission. Bits are grouped and placed on these subcarriers with BPSK, QPSK, 16-QAM or 64-QAM mapping. Subcarriers are separated by $20/64=0.3125$ MHz, and subcarriers $-21$, $-7$, $7$ and $21$ are used for pilot tones. Subcarrier 0 is always 0. The samples on these 64 subcarriers are converted to a 64-sample-long time-domain signal via inverse fast Fourier transform (IFFT) by transformer 15.

Next, the last 16 time-domain samples are copied and inserted into the front of the 64 samples by CP insertion block 16. The inserted portion of the waveform is known as the cyclic prefix (CP). These 80 samples constitute one 802.11n OFDM symbol. The data portion of an 802.11n waveform (normally) consists of multiple OFDM symbols. To further reduce the spectral leakage caused by the discontinuity between OFDM symbols, windowing in the time domain is preferable. For two consecutive symbols, windowing can be achieved by appending the first symbol with the first sample of the IFFT results and then setting the first sample of the second symbol to the average between these two values. Sixteen 0's are inserted into the front of MAC layer bit-streams so that the receiver can determine the scrambler seed the transmitter is using. The data portion is appended to an 802.11n preamble, which contains various parameters used by the transmitter and signals for synchronization and CFO (carrier frequency offset) correction. We used the "Mixed Format" preamble since it is mandatory in 802.11n.

802.11n includes several key features. For this disclosure, the most important is the short guard interval (SGI). With SGI, the length of cyclic prefix (CP) is reduced from 16 samples (800 ns) to 8 samples (400 ns), and hence less impairment is introduced by the insertion of CP. SGI directly increases throughput by more than 10% and therefore, is implemented on all devices from all major vendors even though it is an optional feature. Any 802.11n NIC or router with an advertised speed of 150, 300, 450 or 600 Mbps has the SGI feature.

Frame aggregation is a mandatory feature in 802.11n. Although the maximum length of a single MAC layer payload (MPDU) is 2,304 bytes, the PHY payload (PSDU) can be as long as 65,535 bytes. The 802.11n-compliant NIC's ability to transmit huge packets enables BlueFi to generate a very long waveform if needed. Supporting multiple antennas is a major focus of 802.11n, but it is an optional feature. Therefore, all devices should support using a single spatial stream.

BlueFi starts with a simple principle: as long as the IQ waveforms generated by a WiFi chip are close enough to those generated by a Bluetooth transmitter, Bluetooth devices will be able to correctly receive the signals. Therefore, given a synthesized Bluetooth IQ waveform, this disclosure aims to find a corresponding WiFi bit-stream so that when it is fed into an 802.11n transmitter, the generated IQ waveform will be as close to the Bluetooth IQ waveform as possible. Finding the corresponding bit-stream is somewhat similar to simply decoding an 802.11n packet received from the radio. However, the former differs from the latter in that how "close" the reconstructed IQ waveform is to the target Bluetooth IQ waveform should be determined by the decoding process of a Bluetooth receiver, and a small signal deviation, from the WiFi hardware's perspective, can completely disrupt the decoding process of a Bluetooth receiver.

Figure 2:
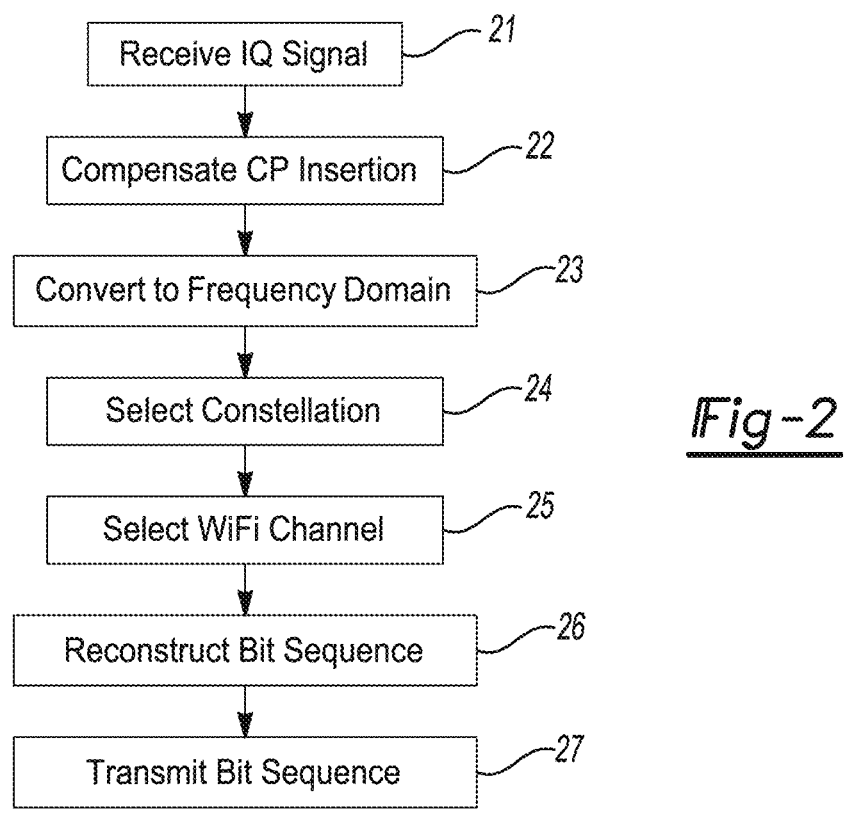
FIG. 2 is a flowchart depicting a technique for transmitting Bluetooth data packets using a WiFi transmitter.

FIG. 2 illustrates a technique for transmitting data packets decodable in accordance with a first wireless communication protocol (i.e., Bluetooth) using a transmitter configured in accordance with a second wireless communication protocol (i.e., WiFi). Just like decoding 802.11n packets, this disclosure proposes to reverse the operation of each block in the transmitter one-by-one. However, the results of the reverse operation of each block are selected based on how close they can reconstruct the IQ waveform from a Bluetooth receiver's perspective.

For reconstruction, a synthesized IQ signal serves as the starting point as indicated at step 21. The in-phase and quadrature (IQ) signal is received by a computer processor, where the IQ signal includes one or more symbols therein and is to be decoded in accordance with the Bluetooth protocol. For simplicity, this technique assumes raw Bluetooth bits, including the entire packet from the preamble to the CRC, serve as input and the payload is properly scrambled with a correct seed. A frequency signal is constructed by converting 1's and 0's with respective frequency deviations. Since typical WiFi hardware generates the IQ signal at the sampling rate of 20 MHz, each 1 or 0 corresponds to 20 samples of the frequency signal. Also, insert 0's to the front and to the back of the frequency signal since such a pattern was observed on commercial Bluetooth chips. Next, the frequency signal is converted to its phase signal by accumulating the frequency signal. Since the center frequency at which the Bluetooth packet is to be transmitted may not be exactly the same as one of the WiFi channels, the phase signal (sample-wise adding linearly increasing phases) is modulated so that the output is the phase signal with respect to the center of a WiFi channel. This modulating operation must be applied before CP insertion since these two operations are not commutative for phase signals. This phase signal is denoted herein as $\theta[n]$.

CP insertion is illustrated with phase signals as one can always convert a phase signal $\theta[n]$ to its corresponding IQ waveform of $e^{i \cdot \theta[n]}$. The input of the CP insertion block can be mapped 1-to-1 to the output, and vice versa. Therefore, instead of seeking an input that will be mapped to the best-fitting IQ waveform, first find an output IQ waveform $\hat{\theta}[n]$ that can be: (1) received by Bluetooth devices, and (2) generated by the CP insertion block.

The output of the CP insertion block always shows the first 8 samples being identical to the last 8 samples in every 72 samples. Therefore, the most basic waveform that satisfies (2) can be generated by copying the first 8 samples to the last 8 samples in every 72 samples. More precisely, the CP insertion process copies the last 8 samples from the last 64 samples and inserts them to the front. However, since we have complete freedom in designing the last 64 samples, they can be generated in a way the last 8 samples appear to have been overwritten by the CP waveform inserted at the front.

In one simple approach, for each symbol, the symbol is compensated for cyclic prefix (CP) insertion as indicated at step 22. For example, each symbol includes a cyclic prefix. The last five samples in the symbol are replaced by the first five samples in the cyclic prefix and the last three samples in the cyclic prefix and replaced by the last three samples in the symbol. In other examples, more or less number of samples can be swapped between the cyclic prefix and the end of the symbol (e.g., 6:2; 4:4; 3:5; etc.). In other words, a given symbol can be manipulated to compensate for cyclic prefix insertion by concatenating the first 8−n samples in cyclic prefix and the last n samples in the given symbol to form a replacement string, and replacing the last 8 samples in the symbol with the replacement string and replacing the CP with the replacement string, where n is an integer between zero and eight.

Figure 3:
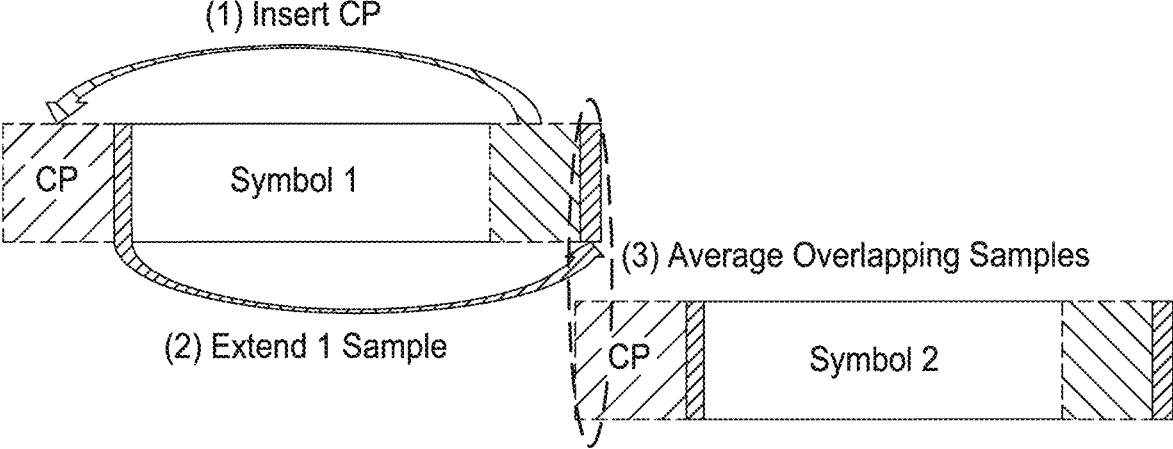
FIG. 3 is a diagram illustrating CP insertion and OFDM symbol windowing.

Although the waveform of this simple method has shown acceptable performance in simulations and when transmitted by a software defined radio according to Universal Software Radio Peripheral (USRP), it shows poor performance when transmitted by real WiFi chips and some Bluetooth receivers have difficulty picking up the signal. By transmitting various IQ waveforms with USRP and analyzing the responses of Bluetooth receivers, it was found that this has something to do with windowing applied to each OFDM symbol. The operation of OFDM windowing is illustrated in FIG. 3. According to the standard, the windowing works by extending each OFDM symbol by 1 sample (which is copied from the sample immediately following the CP) and then averaging the overlapped samples in the time domain. Since adding two phase samples in the time domain creates an erratic phase, the carefully designed phase signal is corrupted in 1 of every 72 samples (on top of the CP corruption). This corruption alone is enough to make the difference of reception/no reception on some devices.

Therefore, one should consider one additional constraint, which can be summarized as the continuity constraint. That is, for each OFDM symbol, the last few samples, along with the extended sample, must appear continuous with the first few samples in the next OFDM symbol. This disclosure presents a way to construct an IQ waveform (whose phase is $\hat{\theta}[n]$) that satisfies all these constraints.

Figure 4:
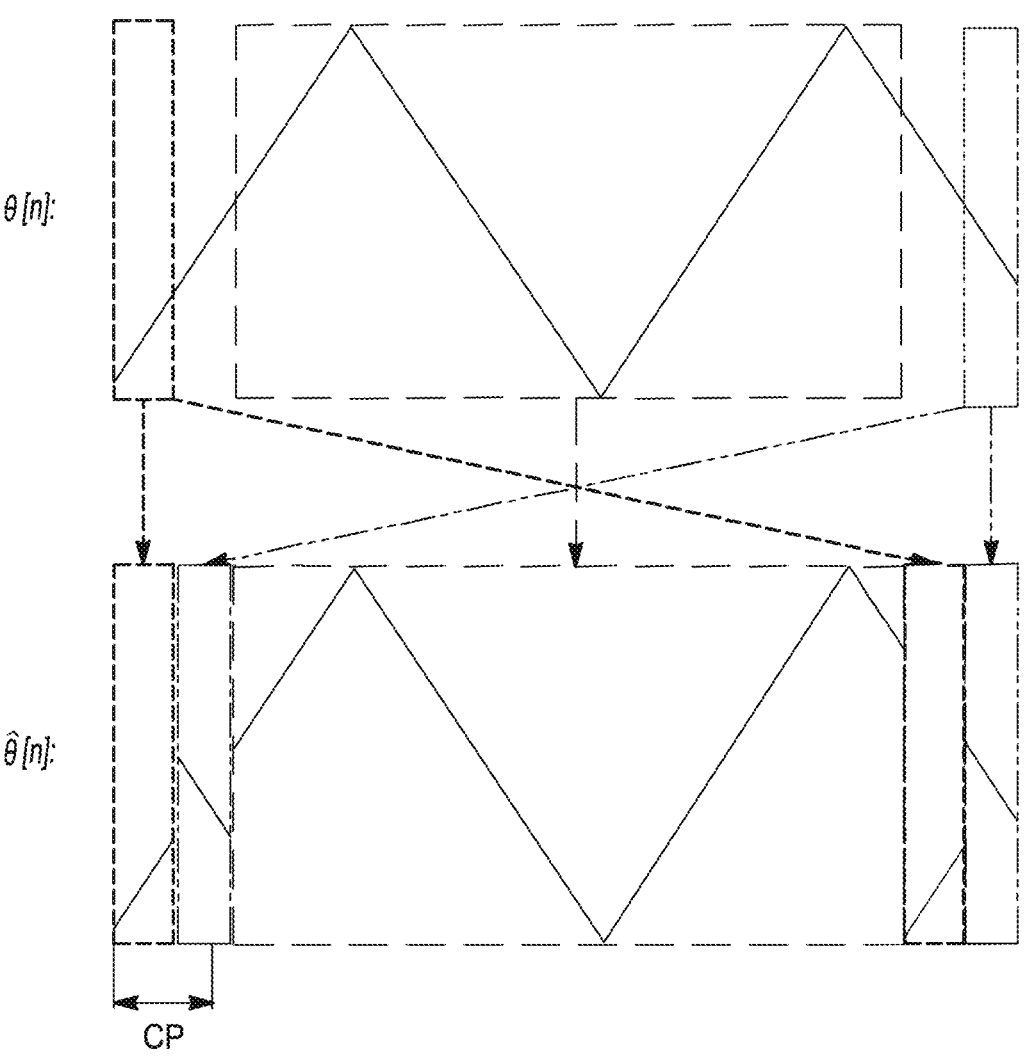
FIG. 4 is a diagram illustrating the CP insertion compensation technique employed in this disclosure.

With continued reference to FIG. 4, the continuity constraint is satisfied by further replacing the first sample after the cyclic prefix of the given symbol with the first sample in the cyclic prefix of the next symbol.

In an example embodiment, the manipulation of the cyclic prefix is performed mathematically as follows:

$$
\hat{\theta}[N+n] = \begin{cases} \theta[N+n], & 0 \le n \le 4 \\ \theta[N+n+64], & 5 \le n \le 8 \\ \theta[N+n], & 9 \le n \le 63 \\ \theta[N+n-64] = \hat{\theta}[N+n-64], & 64 \le n \le 68 \\ \theta[N+n] = \hat{\theta}[N+n-64], & 69 \le n \le 71 \end{cases}
$$

where $N=0, 72, 144, \ldots$. Note that the CP ($0 \le n \le 7$) is exactly the same as the tail ($64 \le n \le 71$). Also, during the windowing operation, each OFDM symbol is extended by one sample $\hat{\theta}[N+72]=\hat{\theta}[N+8]$. Since $\hat{\theta}[N+8]$ is set to the first sample in the next symbol, $\theta[N+72]$, the windowing has no effect on the waveform. ($0.5 \cdot \theta[N+72]+0.5 \cdot \hat{\theta}[N+72]=\theta[N+72]$.)

Since the CP insertion cannot be turned off in commercial chips, signal degradation is unavoidable. However, by designing the waveform this way, the signal degradation is spread out between the first and the last Bluetooth bits in every WiFi OFDM symbol. For these two bits, the degradation is less than 250 ns, which is shorter than the bit duration of 1000 ns. Furthermore, this short-term degradation will mostly appear as a high-frequency ($1/250$ ns=4 MHz) noise and is likely to be attenuated/removed by the band-pass filter on a Bluetooth receiver. The input, $\hat{\phi}[n]$, that should be sent to the CP insertion block can be calculated by removing cyclic prefixes in $\hat{\theta}[n]$.

Returning to FIGS. 1 and 2, the CP insertion block is immediately preceded by an inverse fast Fourier transformer 15 and QAM generator 16. For each symbol, a given symbol is converted from the time domain to the frequency domain at step 23, for example using fast Fourier transform or Discrete Fourier Transform. Applying a transform to the reconstructed input to the CP block obtains the frequency-domain samples that the QAM generator should generate.

Four possible modulation schemes (BPSK, QPSK, 16-QAM and 64-QAM) can be used in 802.11n to generate frequency-domain samples and a higher-order modulation scheme corresponds to a higher data rate. A higher-order modulation has more constellations and hence comparatively higher resolution in the frequency domain. However, even with 64-QAM, the resolution (8 levels or 3 bits in either the real or imaginary part) is very limited, so one must select each constellation carefully to minimize the error of quantizing the real or imaginary part to one of the 8 levels.

Owing to this limitation, it is hard to design an end-to-end algorithm that optimizes the reception performance. Specifically, the restriction of input assuming discrete values can be treated as an integer constraint. The reception performance can be measured by how close the phase of the reconstructed time-domain signal is to the original phase signal. The problem can thus be formulated as an integer-programming (IP) problem. Note that there is no simple formula relating the frequency-domain samples to the phases in the time domain. Obviously, an exact solution can be obtained by exhaustive search or branch-and-bound. However, the complexity of exhaustive search is $64^{52}=2^{312}$ since one can control the samples on 52 frequencies (52 subcarriers for data in 802.11n). Even if one tries to only optimize with samples at 8 subcarriers (corresponding to a bandwidth of $0.3125 \times 8=2.5$ MHz), the complexity is $64^8=2^{48}$. Both are intractable on almost all computing platforms.

Therefore, this disclosure proposes using relaxation, a common practice for approximating the solution of an IP problem. In addition, this disclosure tries to find the best fit for the time-domain waveform instead of the phase of this waveform since some analytical results can be derived.

Suppose for a time-domain waveform x[n], one wants to find a least-square fit $\hat{x}[n]$ with the restriction that its frequency-domain counterpart, $\hat{X}[f]$, only assumes discrete values. That is, $\hat{X}[f] \in \{a+bi | a \in \{\pm1, \pm3, \pm5, \pm7\}, b \in \{\pm1, \pm3, \pm5, \pm7\}\}$. Since $\hat{x}[n]$ is the least-square fit, $\Sigma_n |x[n]-\hat{x}[n]|^2$ is minimized. Let $y[n]=x[n]-\hat{x}[n]$, then by Parseval's Theorem, $\Sigma_n |x[n]-\hat{x}[n]|^2 = \Sigma_n (y[n])^2 = \Sigma_f (Y[f])^2 = \Sigma_f |X[f]-\hat{X}[f]|^2$. Therefore, minimizing the time-domain residue is equivalent to minimizing the frequency-domain residue.

For any given X[f], if one sets $\hat{X}[f]$ to the constellation with the shortest Euclidean distance, then the objective function is minimized. Since only the phase of the time-domain waveform matters to a Bluetooth receiver, a scale factor A can be applied between the time-domain reference and the phase: $x[n]=A \cdot e^{i \cdot \Phi[n]}$. In one example, the scale factor is set to ⅛. This value is chosen such that if the energy of a Bluetooth waveform within one OFDM symbol is mainly concentrated on two subcarriers, each will have a magnitude of around 32 (i.e., =64/2) units, which is close to 35 (i.e., =7·5). In sum, for each symbol, a constellation is selected from a constellation diagram as indicated at step 24, such that the selected constellation has the shortest Euclidean distance to the given system.

Not all subcarriers are modulated by the incoming data. Pilot subcarriers are modulated by known sequences; whereas, null subcarriers are always 0s. Since one cannot control these pilots and nulls, their control problem is solved by frequency planning, leveraging the fact that one can switch WiFi channels and there are large overlaps between WiFi channels. That is, WiFi channels are selected at step 25 that avoid pilot subcarrier and null subcarriers in Bluetooth. For example, suppose one wants to transmit on Bluetooth channel 38 (2426 MHz), then this frequency is covered by WiFi channels 2, 3, 4 and 5, and corresponds to subcarrier 28.8, 12.8, −3.2 and −19.2, respectively. One can calculate its distance to any pilots or nulls and select the channel to keep the Bluetooth channel farthest away from pilots or nulls. In this example, WiFi channel 3 should be used. Using channel 3, the closest pilot is 1.8125 (=5.8*0.3125) MHz away, which is significantly larger than half the bandwidth of Bluetooth signals. This example is merely illustrative of how WiFi channels can be selected and can be readily extended to other scenarios.

With continued reference to FIG. 2, an input bit sequence for an encoder is reconstructed at step 26, thereby constructing a target bit stream for the transmitter, and then the target bit stream is transmitted at step 27 using the transmitter.

Next, the FEC encoder 12 adds redundancy to the bit-stream. Because of the redundancy in its output, an FEC encoder cannot generate arbitrary sequences. To reverse the operation of the encoder, one must build a decoder. This disclosure focuses on convolutional codes since they are mandatory in 802.11n (as opposed to the optional LDPC codes). An FEC encoder can also be viewed as a decompressor; whereas, a decoder can be viewed as a lossy compressor. Consequently, when one tries to reconstruct an output sequence from decoded bits, some of the bits will be different from the original sequence since information is lost when decoding the original sequence.

In the example embodiment, convolutional codes can be optimally decoded by the Viterbi algorithm. The Viterbi algorithm uses dynamic programming to find the input bits corresponding to a sequence that has the least hamming distance (Euclidean distance for soft decoding) to the received sequence. For this decoder, the code rate of ⅚ is used as it has the minimal information loss in the decoding process.

In the conventional Viterbi algorithm, every bit-flip (except for the flip at punctured bits) has an equal weight and the algorithm finds an optimal survival path that minimizes the total weight. However, since Bluetooth signals only occupy part of the WiFi spectrum, bits on subcarriers corresponding to the main Bluetooth spectrum should have as few bit-flips as possible; whereas, the bit-flips on other subcarriers do not really matter. In addition, since bits are interleaved before being mapped to subcarriers, there will be no long runs of bits mapped to the same or nearby subcarriers since adjacent bits are mapped to subcarriers that are far apart. Consequently, it is possible to modify the Viterbi algorithm to further minimize the flips of bits that matter to Bluetooth reception. Specifically, higher weights are assigned to those important bits and the Viterbi algorithm then finds an optimal solution to reduce bit-flips. For example, in Table 1 below, the location the first few bits in an OFDM symbol will be mapped to is calculated. Assuming subcarriers 9 to 16 correspond to the main Bluetooth spectrum, the highest weight is assigned to bits on those subcarriers; a medium weight is assigned to those on 4 subcarriers immediately adjacent to subcarriers 9 to 16 on each side. The absolute value of these weights is not critical since the goal is to assign the priority of each bit. For example, the highest weight means that those bits will only flip if there is no alternative.

TABLE 1

| Weight assignment for the Viterbi algorithm | | | | | |
|---|---|---|---|---|---|
| Bit | Mapped Location | Wt. | Bit | Mapped Location | Wt. |
| 0 | Subcarrier −28, bit 5 | 1 | 9 | Subcarrier 12, bit 5 | 1000 |
| 1 | Subcarrier −24, bit 3 | 1 | 10 | Subcarrier 16, bit 3 | 1000 |
| | . | | 11 | Subcarrier 20, bit 4 | 100 |
| | . | | | | |
| | . | | | | |
| 7 | Subcarrier 3, bit 3 | 1 | 12 | Subcarrier 25, bit 5 | 1 |
| 8 | Subcarrier 8, bit 4 | 100 | | . | |
| | | | | . | |
| | | | | . | |

In another embodiment, the decoding is done using look-up tables, which significantly lowers the complexity while guaranteeing no important bits to flip. For a real-time decoder, the code rate of ⅔ is used since it has the highest compression ratio, and hence can reduce the length of the input bits required for an output sequence of given length. Several observations are as follows. The bit interleaver in WiFi has an internal period of 13 and the same bit location in different cycles corresponds to the same or nearby subcarriers. So, important bits always appear in the same region in each cycle. It was also found that the polynomials for the convolutional coder used in WiFi are chosen in such a way that one can design an algorithm to guarantee that at most ⅓ of bits will be flipped when comparing an arbitrary sequence with its reconstruction after decoding and encoding it with the code rate of ⅔. Specifically, divide the original sequence into groups of 39 bits. For the first 13 bits, pre-generate a lookup table of all possible 12-bit candidates that result in a given 9-bit pattern from bit 5 to bit 13. Because of the well-designed WiFi codebook, any 9-bit pattern has, and only has, eight 12-bit candidates and their first 3 bits are distinct. Note that in the normal process of continuous encoding, bit 0 to 13 are generated by feeding 9 bits into an encoder. Keep track of the last 3 bits of the decoded sequence (or use zeros for initialization). Select the candidate that has the same first 3 bits as these 3 bits and the remaining 9 bits are the decoded sequence for bit 0 to 13. These 12 bits together guarantee that bit 5 to 13 of the reconstructed sequence will not flip while the first 3 bits ensure that the solution for bit 0 to 13 is compatible with the sequence decoded in the last round. Use similar processes to decode bit 14-25 and bit 26-38. This solution guarantees that, after reconstruction/encoding, ⅔ of bits will not flip and bit-flips will only occur near the front for each 13-bit cycle. Using this algorithm, bit-flips can only happen on subcarriers −28 to −8, and hence one can use it for generating Bluetooth packets with a positive frequency shift, and it guarantees that important bits will never flip. For negative frequency shifts, devise a similar algorithm so that bit-flips can only occur on subcarriers 8 to 28.

When using the look-up table method, the desired output bit sequences are grouped into reference segments. Look-up tables are pre-generated. For every reference segment, the algorithm uses part of the reference segment to find all possible input segments, via lookup tables. The algorithm selects the input segment that agrees (the first 3 bits match the last 3 bits of the input segment for the previous reference segment) with the input segment for the previous reference segment. The first 3 bits of the selected segment are then removed. The final result is the serial concatenation of all selected segments.

The feasibility of the proposed technique depends on whether the mapping from the bit-stream to the IQ waveform is deterministic. The only operation in the WiFi transmitter chain that might not be deterministic is the scrambling of bits as the standard suggests use of a "pseudorandom nonzero initial state." For testing and certification, however, the seed (i.e., the initial state of the scrambler) can usually be set to a constant by drivers, although public information on how to do it is very limited and not documented well. The data sheet and register map of almost all WiFi chips are not available. It was found that major vendors, such as Broadcom and Qualcomm, provide functions or register definitions in their drivers to set the scrambler seed to a constant. By capturing the radio signals, it was also found that Realtek chips use fixed scrambler seeds, although the exact values are different for different chip generations (802.11n and 802.11ac).

Since the inverse of an XOR operation is simply the same XOR operation, one can obtain the de-scrambled bit-stream by applying the same scrambler with the same scrambler seed as that used in the WiFi chip.

For an example implementation, this disclosure used Python and real, commercial off-the-shelf WiFi chips. The performance was tested using a GL-AR150 WiFi router, which is equipped with an (Qualcomm) Atheros AR9331 802.11n-compliant SoC and is pre-loaded with OpenWrt. The AR9331 belongs to Atheros's widely-adopted ath79 product family. OpenWrt supports at least 272 routers with ath79 chips. BlueFi does not use any OpenWrt-specific features. OpenWrt is used because its source code is available and one can modify the driver code (ath9k) for the ath79 chip. Also, performance was tested using a TP-Link T2U Nano WiFi NIC. At its core, T2U Nano uses the RTL8811AU chip from Realtek. The Realtek RTL88xx device family is popular among WiFi device makers and dominates the market of USB NICs. Although RTL8811AU supports 802.11ac, we did not use any of the 802.11ac modes.

In an example implementation, the generation and transmission of a packet starts in the user space. An example implementation first gathers payload in accordance with the first wireless communication protocol. 30 bytes of data with 6 bytes of address as the payload is used. Python is used to implement the process described above. The Scipy library is used for FFT computation. The modified Viterbi algorithm is implemented where the optimization takes the weight of each bit into consideration. The final results, in the form of packets in accordance with the second wireless communication protocol, are sent to the hardware in accordance with the second wireless communication protocol for transmission.

The total number of bytes needed to be sent by WiFi hardware is in the range of a few thousand bytes, which is much smaller than the PSDU limits of 65,535 bytes defined in the WiFi physical layer (PHY) standard. It was found that Linux kernel typically fragments packets with the size exceeding the limit of an MPDU (2,304 bytes) or the MTU of Ethernet (1,500 bytes). Because of these limitations, this disclosure directly sends packets in the driver layer. This disclosure can support very long Bluetooth packets (even the longest, optional 5-time-slot packets) after driver modification. For AR9331, the transmission starts in the user space and packets are sent to the ath9k driver in the kernel space via netlink. A callback function will be invoked and set the transmit parameters such as MCS, SGI before invoking the normal transmit function in the driver. For RTL8811AU, first remove the hard-coded limit of 2.304 bytes. This does not affect normal WiFi traffic since Linux kernel fragments outgoing packets. Packets are sent to the driver via a character driver interface. The driver then fills transmit parameters and sends packets to the hardware.

For the best performance, the value of the scrambler seed needs to be known. For Atheros chips, the scrambler seed of earlier ath9k chips can be set to a constant of 1 by clearing the GEN_SCRAMBLER bit in the PHY_CTL register. However, it was found that AR9331 uses an almost entirely different register map. This problem is solved by finding the new location of the register, which is not mentioned anywhere in the data sheet or the driver code. Alternatively, it is possible to determine the scrambler seed without setting registers since scrambler seeds are predictable (increment by 1 in Atheros's implementation) in most WiFi chips. Fixing the seed has no effect on normal WiFi operation and Realtek chips already use a constant by default. This constant (i.e., 71 for RTL8811AU) is found by decoding the WiFi signals it sends.

To evaluate the technique of this disclosure, an iPhone, a Google Pixel and a Samsung S6 (Edge) are used as Bluetooth receivers. The nRF Connect app is used on the iPhone and the Beacon Scanner app is used on Android devices. Signal strength is measured under various conditions for 2 minutes, which is the default measuring duration of nRF Connect. For the transmitter, the majority of tests are done on the GL-AR150 WiFi router as this represents the typical use-case (leveraging WiFi infrastructure for beacons). One can control (start/stop) or modify BlueFi packets remotely via SSH from either the Internet (e.g., cloud servers), local Ethernet or WiFi. To show that this disclosure is vendor-agnostic, tests are also conducted on RTL8811AU. Both AR9331 and RTL8811AU can independently send packets regardless of whether there is any connection to a station or AP or not.

Since the 2.4 GHz spectrum is very crowded and there are at least two other APs operating on the same WiFi channel in the test environment, one expects some interference typical of office environments. The firmware of RTL8811AU or the ART (Atheros Radio Test) partition of AR9331, which is required for regulatory compliance, was not modified.

Phones under test were placed near (~20 cm), close (~1.5 m), and far (4~5 m) from a WiFi transmitter on which this invention runs, and the received signal strengths of packets (RSSI) reported by Bluetooth hardware was collected.

FIG. 5A plots the results of using AR9331, showing that different smartphones can receive Bluetooth packets with consistent performance. Although the measuring duration of nRF Connect is 2 minutes, the iPhone's power-saving mechanism kicks in after approximately 110 seconds elapsed, and therefore iPhone's traces are typically 10 seconds short. One observes different RSSI levels on different phones placed at the same distance. The RSSI of S6 is generally 6~10 dB less than the counterparts. This is most likely due to the fact that the underlying Bluetooth chips have different sensitivity. The same behavior was observed even when dedicated Bluetooth hardware is used. By transmitting BlueFi signals using USRP, it was found that smartphones can pick up Bluetooth signals of as low as −90 to −100 dBm. Therefore, the margin is around 10~20 dB, which is theoretically equivalent to 3~10× in range. FIG. 5B shows the results of using RTL8811AU under the same condition. Compared to FIG. 5A, there are some variations in terms of RSSI, but devices can still steadily receive Bluetooth packets using BlueFi.

Figure 6A:
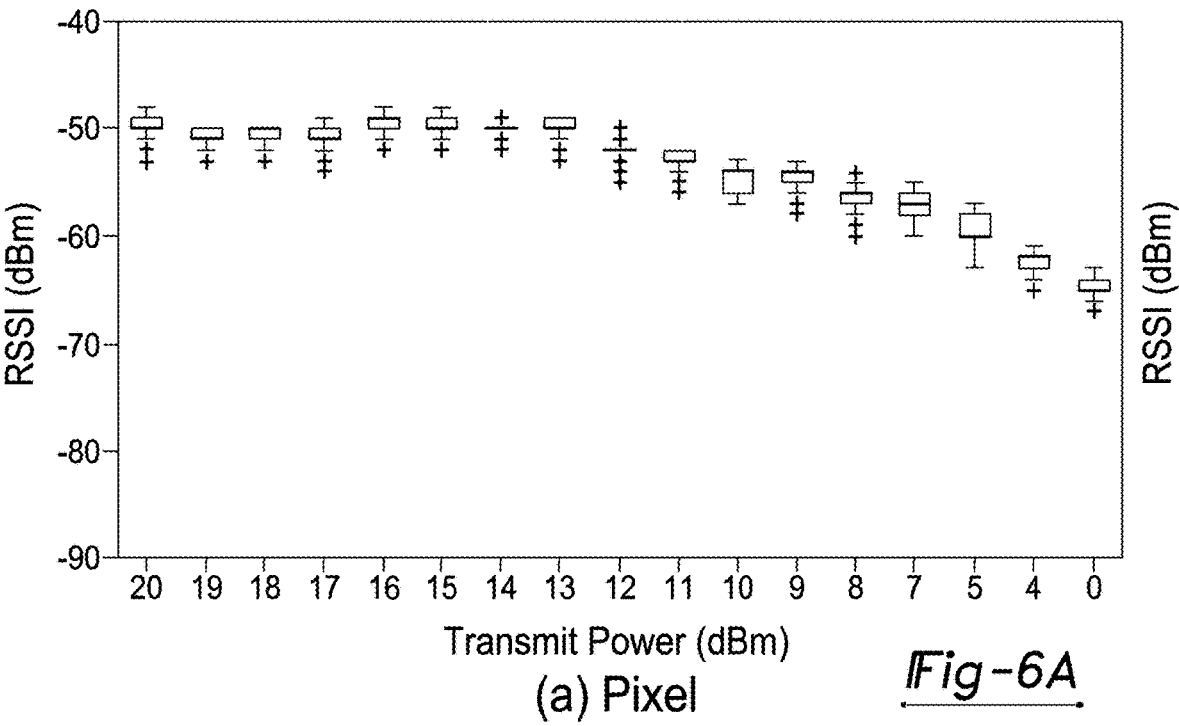
FIGS. 6A-6C are graphs showing the measured signal strength at three phones at different transmit power levels, respectively.
Figure 6B:
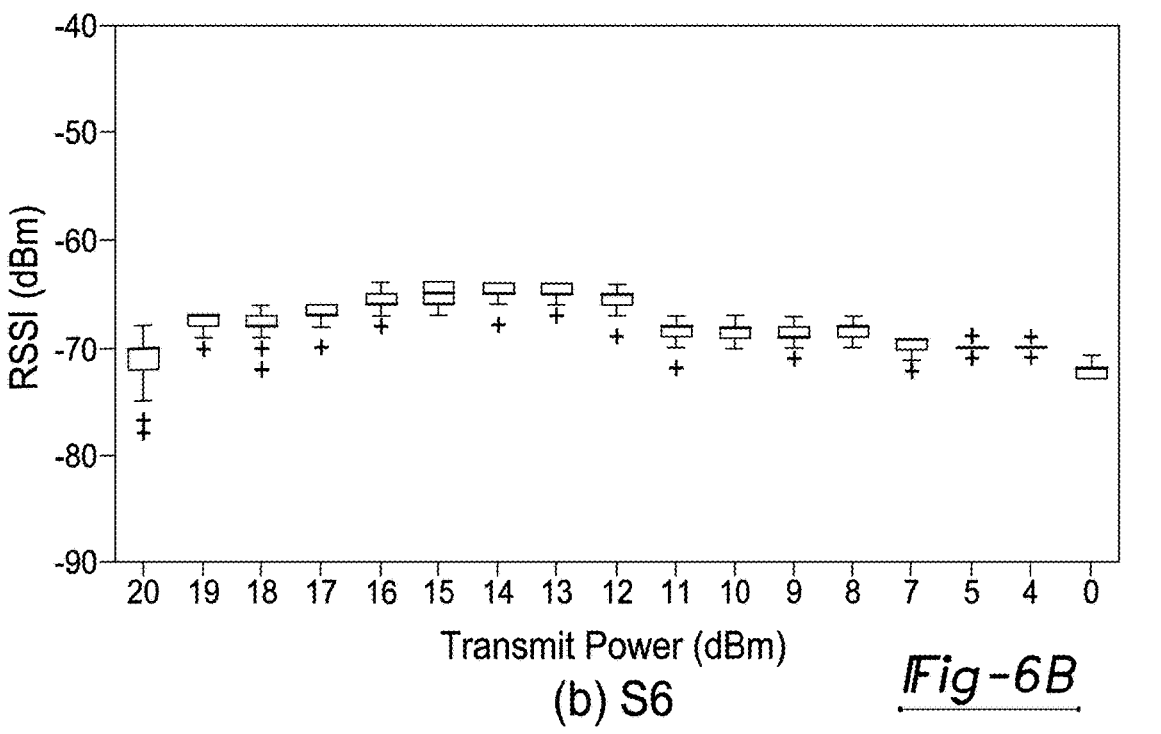
Figures 6C, 7A:
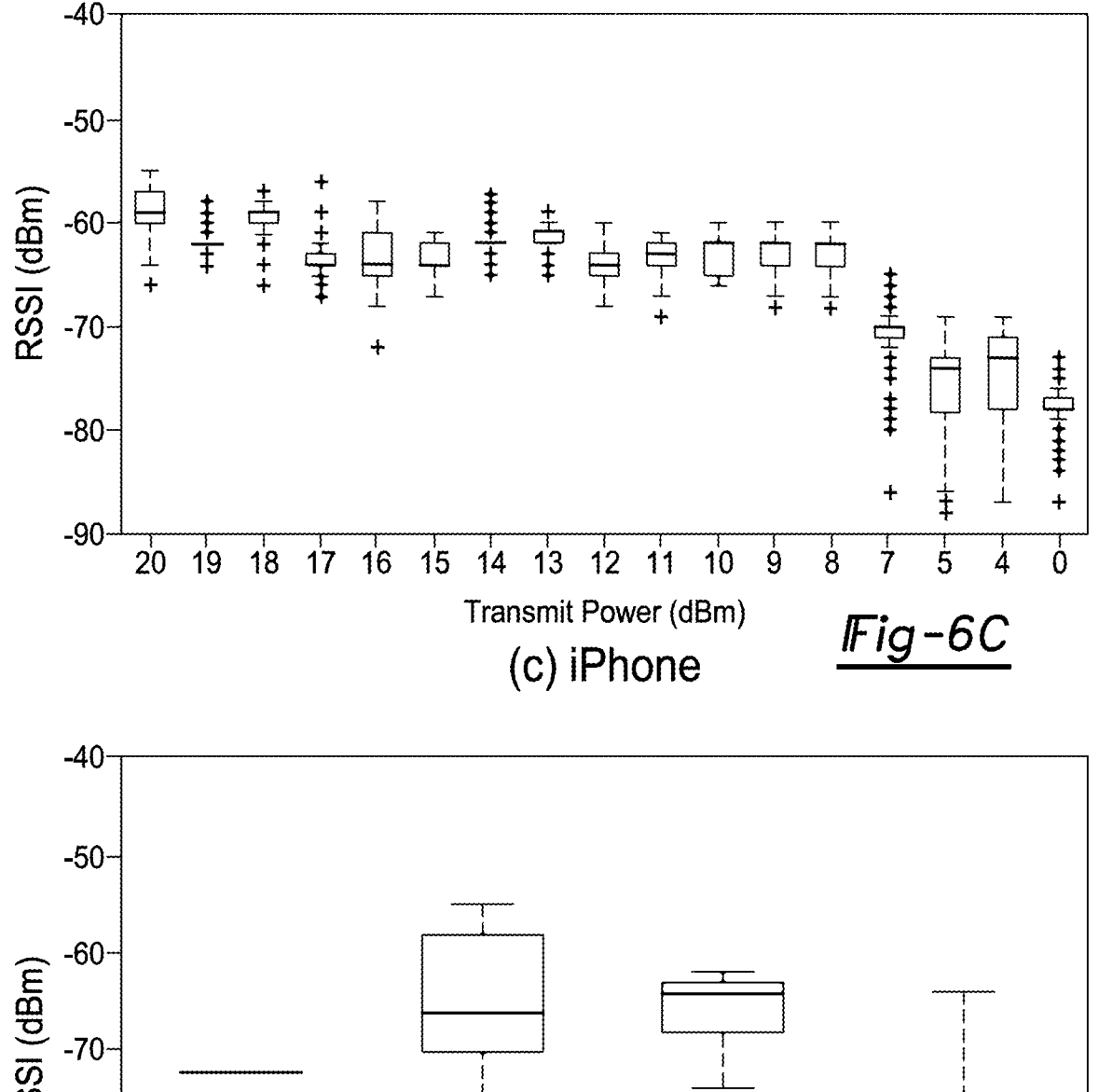
FIG. 7A is a graph showing signal strength for different phones using dedicated Bluetooth hardware.

OpenWrt provides a convenient way to control the transmit power, and hence one can also measure the received signal strength with respect to different transmit power levels. The phones were placed 1.5 m away from the WiFi router. FIG. 6A-6C shows the results. The RSSI is very high on the Pixel and gradually decreases with the transmit power. Even at the router's lowest transmit power of 0 dBm (=1 mW), the RSSI is still significantly higher than −90 dBm. In contrast, such a trend is not so obvious on S6. Its RSSI values may be more sensitive to the waveform impairments than to the absolute power. Although the iPhone's RSSI shows a similar trend as Pixel's, it fluctuates more, which may be the result of multipaths or interference from the environment.

To compare this disclosure with using dedicated Bluetooth hardware, the performance of using conventional Bluetooth transmitters was also measured. Beacon packets are sent using the Beacon Simulator app on Android. The Bluetooth Tx power is set to high and the broadcasting frequency is set to 10 Hz. All other conditions are exactly the same as those described above.

The results are plotted in FIG. 7A, where the first two and the last two columns represent using Pixel and S6 as the transmitter, respectively. Note that the same fluctuating behavior on iPhone can be observed here, and hence one concludes that the transmitter design does not cause such behavior. One can also see that the RSSI is lower on S6 than on iPhone under the same condition.

Since conditions are exactly the same as those described above, FIGS. 6 and 7A can be directly compared. At the Tx power of 8 dBm, the performance of this disclosure is found comparable to those of using a dedicated Bluetooth chip. Therefore, with WiFi chips that nominally come with a default Tx power of 18 dBm, one could expect better performance with using this disclosure.

The effect of this disclosure on concurrent WiFi traffic was also evaluated. iPerf3, a standard tool for benchmarking network throughput, was used. IPerf3 was installed on the WiFi router and configured as an iPerf3 server. A Ubuntu laptop is connected to the router over WiFi and an iPerf3 client was run on the laptop. Throughput measurements were made for 120 s as reported by iPerf3 every second.

As shown in FIG. 7B, four scenarios were tested. The baseline was established by measuring the throughput without any Bluetooth transmission. Then, BlueFi was run on the same WiFi router that also runs iPerf3 server simultaneously. For comparison, the throughput was tested while using dedicated Bluetooth hardware on Pixel and S6 instead.

The figure shows the throughput difference in each scenario to be very small. Although the baseline has the lowest median throughput, it has the highest average throughput (UL: 48.8 Mbps, DL: 48.7 Mbps). With BlueFi, the average throughputs are 47.8 Mbps UL and 47.7 Mbps DL, which are only 1 Mbps lower than the baseline. For comparison, using Pixel and S6 yields average throughputs of 48.6/48.6 and 48.4/48.3 Mbps, respectively. Note the contention for airtime is not the only factor that limits the throughput. Since BlueFi sends packets by the single-core microcontroller in the AR9331, it consumes a tiny amount of the CPU and memory (0% of the CPU and 1% of the virtual memory), which most likely contributes to the reduction in throughput. This slight reduction in throughput may be a worthy trade-off for WiFi infrastructures to support various Bluetooth apps.

Background WiFi traffic has very little effect on this disclosure. As FIG. 7C shows, all phones can still steadily receive Bluetooth packets even when the WiFi channel is saturated. The WiFi traffic only causes the Pixel's RSSI to fluctuate by a small amount. As usual, the power-saving mechanism causes anomalies in the iPhone's trace near the end.

Figures 8A, 8B:
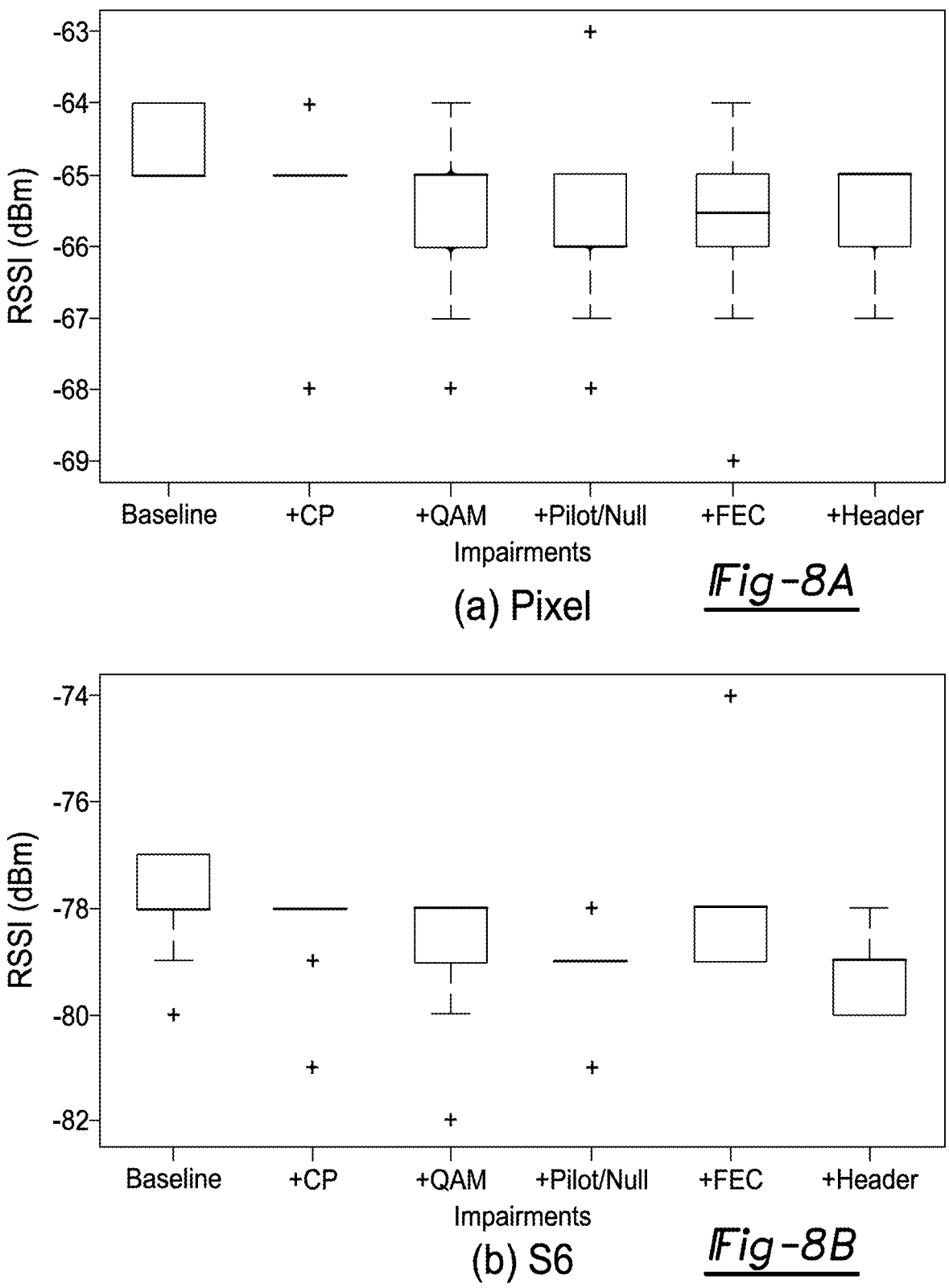

To see the effect of the impairment caused by each block in a WiFi transmitter, various waveforms are generated and transmitted using USRP. In FIGS. 8A-8C, a standard FSK waveform is generated as the baseline for three different phones and each impairment is cumulatively applied in each column. The last column represents sending a complete 802.11n PSDU. As the figure shows, each impairment degrades signal quality by approximately 1 dB and the overall degradation is around 2 dB. Note that this disclosure reverses the WiFi operation block-by-block and does not aim to globally optimize the process. Therefore, some bit-flips, caused by adding the FEC and the header, may slightly enhance the signal quality.

Other applications can also use disclosure as their Bluetooth physical and link layers. This is demonstrated by building an audio transmitter with A2DP. For general applications, Bluetooth devices transmit packets at the start of predetermined time slots and hops to different frequencies for different time slots. Therefore, this invention needs to follow a strict frequency hopping sequence and transmit the generated packets within the targeted time slot.

On the other hand, WiFi hardware has a few limitations, making it harder to follow the frequency hopping sequence. Bluetooth hops to a different frequency every 1.25 ms and WiFi chips are not designed to constantly hop at such a pace. Also, Bluetooth hops randomly across 79 channels, spanning 79 MHz, which is much larger than the bandwidth of a single 802.11n channel. Finally, the process of generating raw Bluetooth bits from a higher-layer payload depends on the Bluetooth clock value in the transmission time slot. Thus, packets need to be generated shortly before the transmission and then released precisely at the desired time slot.

Several strategies are used to overcome these limitations. Instead of constantly changing the physical WiFi channels, a single WiFi channel is used and frequency hopping is implemented using different subcarriers within a WiFi channel. Since one WiFi channel only has a bandwidth of 20

MHz, it cannot cover the 79-channel hopping sequence. This issue is solved by using Bluetooth's adaptive frequency hopping (AFH) feature to only use the 20 channels corresponding to the single selected WiFi channel. AFH simply remaps the channel outside of these channels to one of the 20 channels and has no effect on the theoretical throughput. Finally, the high-resolution timer in the Linux kernel is used to precisely schedule the transmission of each BlueFi packet.

To emulate the behavior of switching Bluetooth channels ("frequency hopping") without actually changing the center frequency of the WiFi hardware, the Bluetooth IQ signals, which are generated from the Bluetooth GFSK bits for each Bluetooth packets, are first modulated with a certain frequency offset, before further processing (i.e., cyclic prefix compensation, etc.) as seen in FIG. 10. Each frequency offset corresponds to the frequency difference between the desired Bluetooth (channel) frequency and the center frequency of the WiFi hardware. For example, if the WiFi hardware is operated at 2422 MHz whereas a Bluetooth packet needs to be transmitted at 2423 MHz at a certain instant, a frequency offset of 1 MHz is first introduced to the IQ signals of this Bluetooth packet before any processing.

Modulating the IQ signals can be implemented by directly multiplying incoming IQ signals, where each IQ sample is a complex number, with a complex sinusoid. Specifically, let the input IQ signal be A[t], the frequency-shifted IQ signal B[t] will be $A[t] \cdot e^{i \cdot \Omega \cdot t}$, where i is the imaginary unit and $\Omega$ is a constant (for a given frequency offset) that is proportional to the frequency offset and inversely proportional to the sampling rate of the IQ signals.

Equivalently, as the information of Bluetooth signals is only embedded in the phase of the IQ signals, modulating the IQ signals can also be done in the phase domain. Specifically, let $\theta_A[t]=\angle A[t]$ and $\theta_B[t]=\angle B[t]$, then $\theta_B[t]=\theta_A[t]+\Omega \cdot t$. Finally, since the frequency signal is the difference of two phase samples, shifting the frequency can also be implemented in the frequency domain. Let $\varphi[t]=\theta[t]-\theta[t-1]$, then $\varphi_B[t]=\varphi_A[t]+\Omega$.

For streaming audio, the process begins with collecting audio packets from Bluetooth software stacks. In addition, Bluetooth software stacks are configured to send longer packets ("multi-slot packets"), such as DM3, DH3, DM5 or DH5 packets described in the Bluetooth standard, if the upper Bluetooth software stack supports them. Since this disclosure works on the Bluetooth GFSK bit level, it is agnostic to the type of the packets used. That is, for any incoming packet, this disclosure simply converts it into a series of GFSK bits and then the IQ or phase samples, and the same process applies whether these bits represent single-slot packets (e.g., DM1 packets) or multi-slot packets. However, since using multi-slot packets yields higher throughput, they are preferred packet type when possible.

Audio packets collected are scheduled to be transmitted at a time instant in the near future. The scheduled time instant should be long enough that all the software processing is completed before the time instant. Furthermore, the time instant needs to be aligned with Bluetooth time slots. Also, the selected time instant (and therefore the associated time slot) requires the Bluetooth packets to be sent at a certain Bluetooth channel. Different Bluetooth channels within one WiFi channel may have different transmit performance. Therefore, some time slots may be skipped in favor of time slots associated with Bluetooth channels that have better performance. For a given time slot, the desired Bluetooth (channel) frequency is calculated using the frequency hopping algorithm described in the Bluetooth standard.

For an audio packet, the target frequency offset (with respect to the WiFi center frequency) will be determined once a time slot is selected. The IQ (or phase) signal for this audio packet is shifted in frequency by this offset. The modulated signal is converted to the corresponding WiFi bit stream, by the procedure described earlier in this disclosure, and encapsulated as a WiFi packet that needs to be sent by the WiFi hardware. The WiFi packets converted from Bluetooth packets are first stored in memory.

The actual transmission of the stored WiFi packets is triggered by a timer. Specifically, a timer is continuously tracking the current time. The trigger interval of the timer is set to one time slot of the Bluetooth protocol. When triggered, the timer checks the scheduled time of the stored WiFi packets in the memory. If the current time instant matches that of a WiFi packet, the WiFi packet is released from memory and sent to the WiFi hardware for transmission. For best performance, a high-precision timer should be used so that the transmission of each WiFi packet is aligned with Bluetooth time slots as close as possible.

In an example implementation, this disclosure is run locally on an i5-3210M laptop and transmits packets using RTL8811AU. The implementation is tested with Sony SBH20 Bluetooth headphones and its performance is also quantitatively measured using FTS4BT from Frontline, a standard tool used by industry leaders like CSR and Broadcom. Note that the tool uses CSR's widely-adopted BlueCore chips as the underlying hardware, and hence the results are representative of reception using off-the-shelf Bluetooth chips. The FTS4BT's PER and throughput measurements are reported.

Due to nulls and pilots, the performance of transmission on each Bluetooth channel is different within a single WiFi channel. For example, FIG. 9A shows the packet error rate (PER) reported by FTS4BT of BlueFi transmitting singleslot packets on 10 different channels. PER is shown to be as low as 1.9% on good channels whereas it is much higher for channels adjacent to WiFi pilots. The measured throughput for the upper layer is 37.5 kbps, since single-slot packets have significant overhead and we only use half of the channels. Note that Bluetooth's frequency hopping algorithm does not guarantee uniform assignment from time slots to channels.

The throughput and goodput are increased vastly by using multi-slot packets, which incur much less overhead. More importantly, since the frequency will remain the same for multiple slots, this effectively covers nearly 2× or 3× the number of time slots with the same number of Bluetooth channels.

To keep PER low for multi-slot packets, select three best channels to transmit audio packets. Re-route PulseAudio and send A2DP audio streams to BlueFi which then allocates a time slot and calculates its hopping frequency. If it matches the channels in use, BlueFi additionally allocates 4 subsequent time slots for an audio packet. The clock value of the allocated slots is used to convert the audio stream, which is a standard L2CAP stream, into raw Bluetooth bits. L2CAP is a universal layer on which almost all Bluetooth apps rely. With these bits and a desired frequency offset, BlueFi then performs various signal processing tasks and generates a WiFi packet. The packet is marked with the clock value and sent to the driver. Inside the driver, a high resolution timer is constructed to schedule the packet to be transmitted at the precise instant specified by its clock value.

BlueFi can be used to stream real-time stereo audio to Sony SBH20 Bluetooth headphones. In addition, FTS4BT is used to measure the throughput and PER. The Bluetooth headphones were not modified in any way. Without any firmware modification, a connection token is needed in order for the headphones to accept incoming audio data, and the token is created by making a connection with Bluetooth hardware. Once the connection token is created, BlueFi can stream audio on its own. FIG. 9B shows the PER when streaming audio. Longer packets increase PER. The overall PER is 23% and the upper-layer throughput is measured at 122.5 kbps, corresponding to a goodput of 93.4 kbps. Throughput and goodput can be increased, at the expense of higher PER, by filling unoccupied time slots with single or multi-slot packets. Conversely, PER can be drastically decreased by using fewer channels or shorter packets. We leave further optimizations as future work.

SBC (sub-band coding) codec is used as it is the mandatory and the only codec supported by Sony SBH20. Advanced codec shouldn't cause any difficulty working with BlueFi since BlueFi, like any other BT radio and PHY, is only responsible for sending 1's and 0's and upper layers are oblivious to how the radio and PHY are actually implemented.

A first prototype uses Python and generating a single packet using Python takes around 2.60 s, which includes IQ generation (0.01 s), FFT and QAM (0.18 s). FEC decoder (2.39 s), scrambler (<0.01 s) and file operation (0.01 s). The runtime is drastically improved by porting BlueFi to C. The C version produces identical outputs as the Python prototype and generating a single packet takes 46.88 ms, more than 55× faster. Almost 100% of the execution time is spent on the FEC decoder. The Viterbi algorithm uses dynamic programming and has a pseudo-polynomial runtime of $O(Tn^2)$, where T is the length of a sequence and n is the number of states. The relatively long runtime when applying the algorithm is the result of long sequences and a high (64) number of states.

By replacing the Viterbi algorithm with a real-time decoder (with a complexity of $O(T)$) and by using the FFTW library, the execution time of BlueFi can be reduced by approximately another 50×. On an old (Ivy Bridge) i5 laptop, the execution time is around 0.954 ms (with the standard deviation of 0.122 ms), which is less than the minimal interval (1.25 ms) of two consecutive Bluetooth packets. Therefore, BlueFi can run in real time and the delay incurred is around 0.954 ms. The timeliness is important since Bluetooth payloads are scrambled with the clock value at the time of transmission and real-time generation greatly simplifies the design. More importantly, the throughput is not limited by the computation. One expects the execution time to be even lower if newer hardware, SIMD, hardware acceleration or multithreading is used.

Although supporting the 2.4 GHz band is not strictly required for 802.11ac, most 802.11 ac devices do support the dual band operation since operating at only the 5 GHz band makes the device incompatible with 802.11b, g and 2.4 GHz 802.11n devices. 802.11ac supports 256-QAM and some chips even support 1024-QAM. Higher-order modulation means higher resolution in the frequency domain, and therefore one expects less quantization error in the QAM process. In 802.11ax, 1024-QAM becomes mandatory. New modes in 802.11ax use longer guard intervals, and thus they are not particularly useful to BlueFi.

BlueFi enables the possibility of fine-grain cooperation and scheduling between WiFi and Bluetooth. Previously, the solutions for Bluetooth and WiFi coexistence were complicated. For example, the codes in the RTL8811AU driver for dealing with Bluetooth coexistence are nearly 6000 lines long. By converging two standards on one hardware, BlueFi simplifies the coexistence problem by eliminating the inter-chip messaging and delay.

In an example implementation, this disclosure assigns resulting WiFi packets to transmit to queues just like typical WiFi packets. It is possible to further optimize the priority assignments of both WiFi and Bluetooth packets so that time-sensitive packets, such as audio data, are given priority regardless of whether they are sent over WiFi or Bluetooth.

BlueFi realizes Bluetooth's radio and physical layers (radio, "baseband" and link control in Bluetooth's terminology), on which all apps and profiles are built, and more. These layers transmit a series of 1's and 0's and are oblivious of the content these bits represent. Therefore, any app or profile can use BlueFi for Bluetooth transmission. This disclosure focused on transmission. Note that transmission alone is still very useful in many cases. For example, signal reception is totally unnecessary for beacons. Also, when using A2DP to stream audio, the uplink traffic is only for sending ACK packets and is not critical to the audio operation. Furthermore, the nature of audio streaming makes ARQ less useful. For example, for very low latency audio, retransmitted packets will miss the deadline. In addition, excessive retransmissions not only increase latency but also decrease usable throughput or goodput. It is noted that regulatory certification is not needed for receivers. Therefore, it is possible to use BlueFi in conjunction with a dedicated receiving chip to realize full Bluetooth function without the need for regulatory certification.

Some Bluetooth chips are capable of supporting optional modulation modes other than GFSK and thus increase throughput by up to 3×. It is also possible to use 40 MHz WiFi channels to support 2× the number of Bluetooth channels and increase throughput.

The BlueFi technique enables tremendous opportunities for real-world applications. For example, BlueFi makes it possible to send Bluetooth beacons using WiFi infrastructures that have already been deployed almost everywhere. This will be very useful, especially in corporate, business or public environments, to provide useful features, such as way-finding, navigation, proximity marketing and more, all besides WiFi connectivity, simultaneously. Because of such market demands, various solutions have already been proposed. For example, the Cisco Virtual Beacon adds the Bluetooth beacon functionality to existing Cisco APs. However, the Cisco solution requires a dedicated, purpose-built hardware to be installed on every AP and hence incurs hardware and deployment costs. The word "virtual" refers to the fact that it is a networked solution and allows remote management and updates. In contrast, implementing such functionality with BlueFi incurs no additional hardware and deployment costs. In a sense, BlueFi is a true virtual solution that enables Bluetooth purely on the software level.

BlueFi can work with general and real-time Bluetooth apps as well. BlueFi will help eliminate the need for dedicated Bluetooth or combo chips in future devices, saving costs and the precious board-space, which is very important for small devices such as smart phones or watches. Alternatively, BlueFi can help users use Bluetooth headphones with laptops or desktops with old or no Bluetooth hardware.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for transmitting data packets decodable in accordance with a first wireless communication protocol using a transmitter configured in accordance with a second wireless communication protocol, comprising:

receiving, by a computer processor, an in-phase and quadrature (IQ) signal to be sent by the transmitter, where the IQ signal includes one or more symbols therein and is to be decoded in accordance with the first wireless communication protocol;

for each of the one or more symbols, manipulating a given symbol to compensate for cyclic prefix insertion, converting the manipulated symbol from time domain to frequency domain, and selecting a constellation from a constellation diagram for the converted symbol, where the selected constellation has shortest Euclidean distance to the converted symbol and corresponds to a bit sequence; and for each bit sequence, reconstructing, by the computer processor, an input bit sequence for an encoder, thereby constructing a target bit stream for the transmitter.

2. The method of claim 1 further comprises transmitting the target bit stream using the transmitter.

3. The method of claim 1 wherein manipulating the given symbol to compensate for cyclic prefix insertion comprises replacing the last n samples in the cyclic prefix with the last n samples in the given symbol, concatenating the first 8−n samples in the cyclic prefix and the last n samples in the given symbol to form a replacement string, and replacing the last 8 samples in the symbol with the replacement string, where n is an integer between zero and eight.

4. The method of claim 2 wherein manipulating the given symbol to compensate for cyclic prefix insertion comprises replacing a first sample after the cyclic prefix of the given symbol, with a first sample in a next cyclic prefix.

5. The method of claim 1 further comprises manipulating the given symbol to compensate for cyclic prefix insertion in accordance with $$\hat{\theta}\ [N+n] = \begin{cases} \theta\ [N+n], & 0 \le n \le 4 \\ \theta\ [N+n+64], & 5 \le n \le 8 \\ \theta\ [N+n], & 9 \le n \le 63 \\ \theta\ [N+n-64] = \hat{\theta}\ [N+n-64], & 64 \le n \le 68 \\ \theta\ [N+n] = \hat{\theta}\ [N+n-64], & 69 \le n \le 71 \end{cases}$$

Where $\Theta$ is phase, N is number of samples in the given symbol and n is a sample in the given symbol.

6. The method of claim 1 further comprises transmitting the target bit stream using shortest cyclic prefix.

7. The method of claim 1 wherein converting the manipulated symbol from time domain to frequency domain comprises using Discrete Fourier Transform.

8. The method of claim 1 wherein the input bit sequence is reconstructed using a Viterbi algorithm.

9. The method of claim 1 wherein the input bit sequence is reconstructed using lookup tables.

10. The method of claim 1 further comprises selecting a frequency in the second wireless communication protocol such that pilot subcarriers and null subcarriers in the second wireless communication protocols have minimal frequency overlap with a desired transmitting channel of the first wireless protocol.

11. The method of claim 1 further comprises aligning transmission of each data packet prepared in accordance with the second wireless communication protocol with time slots of the first wireless communication protocol.

12. The method of claim 1 further comprises modulating the IQ signal within one channel of the second communication protocol to compensate for frequency difference between the second communication protocol and the first communication protocol, where the step of modulating the IQ signal occurs before the step of manipulating the given symbol to compensate for cyclic prefix insertion.

13. A computer-implemented method for transmitting data packets decodable in accordance with a first wireless communication protocol using a transmitter configured in accordance with a second wireless communication protocol, comprising:

receiving, by a computer processor, an in-phase and quadrature (IQ) signal to be sent by the transmitter, where the IQ signal includes one or more symbols therein and is to be decoded in accordance with the first wireless communication protocol;

for each of the one or more symbols, manipulating a given symbol to compensate for cyclic prefix insertion, converting the manipulated symbol from time domain to frequency domain, and selecting a constellation from a constellation diagram for the converted symbol, where the selected constellation has shortest Euclidean distance to the converted symbol and corresponds to a bit sequence; wherein the given symbol is manipulated to compensate for cyclic prefix insertion by replacing the last n samples in the cyclic prefix with the last n samples in the given symbol, replacing a first sample after the cyclic prefix of the given symbol with a first sample in a next cyclic prefix, concatenating the first $8-n$ samples in the cyclic prefix with the last n samples in the given symbol to form a replacement string, and replacing the last 8 samples in the symbol with the replacement string, where n is an integer between zero and eight;

for each bit sequence, reconstructing, by the computer processor, an input bit sequence for an encoder, thereby constructing a target bit stream for the transmitter; and transmitting the target bit stream using the transmitter.

14. The method of claim 13 further comprises transmitting the target bit stream using shortest cyclic prefix.

15. The method of claim 13 wherein converting the manipulated symbol from time domain to frequency domain comprises using Discrete Fourier Transform.

16. The method of claim 13 further comprises selecting a frequency in the second wireless communication protocol that avoids pilot subcarriers and null subcarriers in the second wireless communication protocols.

17. The method of claim 13 further comprises aligning transmission of each data packet prepared in accordance with the second wireless communication protocol with time slots of the first wireless communication protocol.

18. The method of claim 13 further comprises modulating the IQ signal within one channel of the second communication protocol to compensate for frequency difference between the second communication protocol and the first communication protocol, where the step of modulating the IQ signal occurs before the step of manipulating the given symbol to compensate for cyclic prefix insertion.

19. A computer-implemented method for transmitting data packets containing audio data and decodable in accordance with a first wireless communication protocol using a transmitter configured in accordance with a second wireless communication protocol, comprising:

receiving, by a computer processor, an in-phase and quadrature (IQ) signal to be sent by the transmitter, where the IQ signal includes one or more symbols therein and is to be decoded in accordance with the first wireless communication protocol;

modulating the IQ signal within one channel of the second communication protocol to compensate for frequency difference between the second communication protocol and the first communication protocol;

for each of the one or more symbols, manipulating a given symbol to compensate for cyclic prefix insertion, converting the manipulated symbol from time domain to frequency domain, and selecting a constellation from a constellation diagram for the converted symbol, where the selected constellation has shortest Euclidean distance to the converted symbol and corresponds to a bit sequence; and for each bit sequence, reconstructing, by the computer processor, an input bit sequence for an encoder, thereby constructing a target bit stream for the transmitter.

20. The method of claim 19 wherein modulating the IQ signal within one channel of the second communication protocol comprises introducing a frequency offset to the IQ signal.

21. The method of claim 19 wherein modulating the IQ signal within one channel of the second communication protocol further comprises frequency hopping the IQ signal amongst subcarrier frequencies within the one channel of the second communication protocol.

* * * * *